United States Patent
Sung et al.

(10) Patent No.: US 7,349,447 B1
(45) Date of Patent: Mar. 25, 2008

(54) METHOD AND APPARATUS FOR ORTHOGONAL CODE HOPPING MULTIPLEXING COMMUNICATIONS

(75) Inventors: Dan-Keun Sung, Taejon (KR); Su Won Park, Taejon (KR)

(73) Assignees: Korea Advanced Institute of Science and Technology, Taejon (KR); Electronics and Telecommunications Research Institute, Daejon (KR)

( * ) Notice: Subject to any disclaimer, the term of this patent is extended or adjusted under 35 U.S.C. 154(b) by 923 days.

(21) Appl. No.: 10/030,190

(22) PCT Filed: Aug. 3, 2000

(86) PCT No.: PCT/KR00/00856

§ 371 (c)(1),
(2), (4) Date: Feb. 4, 2002

(87) PCT Pub. No.: WO01/11897

PCT Pub. Date: Feb. 15, 2001

(30) Foreign Application Priority Data

Aug. 5, 1999 (KR) ............................ 1999/32187

(51) Int. Cl.
*H04J 3/02* (2006.01)
(52) U.S. Cl. .................. 370/535; 370/342; 370/335; 370/203; 375/130
(58) Field of Classification Search .............. 370/535, 370/537, 342, 347, 441, 442, 206, 209, 210, 370/203, 335; 375/130, 131, 140
See application file for complete search history.

(56) References Cited

U.S. PATENT DOCUMENTS

| 5,771,288 | A  | * | 6/1998 | Dent et al. ................ | 380/270 |
| 6,498,788 | B1 | * | 12/2002 | Emilsson et al. ........... | 370/342 |
| 6,657,985 | B1 | * | 12/2003 | Park ........................... | 370/342 |

FOREIGN PATENT DOCUMENTS

| EP | 0902549 | 3/1999 |
| GB | 2331207 | 5/1999 |

OTHER PUBLICATIONS

Chen et al, Multicarrier CDMA with Adaptive Frequency Hopping for Mobile Radio Systems, pp. 1852-1858, 1996.*

* cited by examiner

Primary Examiner—Ajit Patel
(74) Attorney, Agent, or Firm—Greenblum & Bernstein, P.L.C.

(57) ABSTRACT

A method and system for statistically multiplexing corresponding channels using an orthogonal code hopping in a wire/wireless communication system, including a first communication station and multiple second communication stations, in which multiple synchronized communication channels coexist through one media. The system includes an orthogonal code hopping pattern generator, a spreader for selecting a corresponding orthogonal code symbol in the orthogonal code, a collision comparator and controller for monitoring whether the orthogonal code symbols collide and for determining whether the send data symbols to the second communication stations coincide in the collision area, a unit for stopping transmission in case of collision of the hopping patterns and discordance of the transmission data symbols, and a transmission power controller for compensating an average receiving energy loss.

42 Claims, 26 Drawing Sheets

US 7,349,447 B1

METHOD AND APPARATUS FOR ORTHOGONAL CODE HOPPING MULTIPLEXING COMMUNICATIONS

TECHNICAL FIELD

The present invention relates to an apparatus and a method for statistically multiplexing channels using an orthogonal code hopping in a wire/wireless communications system where a plurality of the channels synchronized through one media and having a low data activity coexist. More particularly, the present invention relates to an apparatus and a method in which, in a system having a first communication station and a plurality of second communication stations synchronized with the first communication station, the first communication station recognizes a channel toward each second communication station with an orthogonal code hopping pattern, the orthogonal code hopping pattern of the second communication stations is determined at random, orthogonal code symbols in the hopping patterns of different channels may coincide at an instance (hereinafter, the above coincidence of the orthogonal code symbols is referred to as "hopping pattern collision"), the system inspects send data symbols for all send channels of the first communication station related with the collision and makes a corresponding data symbol interval OFF if any channel sends a data symbol not coincident with other channels, and transmission power of all channels where transmission of the data symbol is OFF as much as an amount and during an interval defined in a communication protocol in order to supplement average bit energy of loss data in all relevant channels.

BACKGROUND ART

Descriptions in this application are based on a wireless communications system, however the statistical multiplexing suggested in the application may be applied to a wired communications system as well as the wireless communications system without any change.

In order to point out clearly which parts or concepts are developed or improved in the present invention in comparison with the prior art, a prior art is described on the basis of communications system IS-95, which is already in service.

A first communication station and a second communication station in this application correspond to a base station and a mobile station in a conventional system. One first communication station communicates with a plurality of second communication stations and the present invention suggests a statistical multiplexing, which may be applied to a synchronized channel group having an orthogonality from the first communication station toward the second communication stations. For a system, which maintains the orthogonality only for each channel group, such as Quasi-Orthogonal Code (QOC) adapted to Code Division Multiplexing Access (CDMA) 2000, which is one candidate technique for a next generation mobile communications system, referred herein as "the IMT-2000 (International Mobile Telecommunications-2000)", the present invention may be independently implemented for each channel group. Moreover, when classifying channels of the first communication station such as sectored or smart antenna systems into channel groups having the same send antenna beam, the present invention may be independently implemented in each channel group.

In the OCDM (Orthogonal Code Division Multiplexing) communications method adapted by the conventional IS-95 system, the first communication station allocates orthogonal code symbols, which have not been allocated among the orthogonal codes when establishing a call, to one of the second communication stations and the second communication station gives back the allocated orthogonal code symbols to the first communication station when releasing the call, such that other second communication stations may use the orthogonal code symbols.

In description of the prior art, same reference number is used for a component having same function as that of the present invention.

FIG. 1 shows a system according to both the prior art and the present invention. As shown in the figure, each communication channel 121, 122, 123 from the first communication station 101 to the second communication stations 111, 112, 113 is synchronized with maintaining orthogonality.

FIG. 2a shows configurations of a transmitter of the first communication station, which corresponds to a common element of the prior art and embodiments of the present invention. FIG. 2b shows configurations of the transmitter of the first communication station for a traffic channel of the prior art.

A pilot channel 200 is used as a reference signal for initial synchronous detection and tracking and synchronous decoding in the second communication station of FIG. 1. The pilot channel 200 is commonly used in all second communication stations in an area covered by the first communication station. The pilot channel 200 provides a phase reference for the synchronous decoding by transmitting symbols having a known pattern without passing through channel coding and channel interleaving as shown in FIG. 2a.

A synchronous channel 210 is a broadcast channel which is one-sidedly transmitted to all second communication stations in an area covered by the first communication station, like the pilot channel 200. The first communication station transmits information (e.g. visual information, an identifier of the first communication station, etc.), which the second communication stations commonly require, to the second synchronous channel 210 through the synchronous channel 210. The data from the synchronous channel 210 pass through a convolutional encoder 214, a repeater 216 for adjusting a symbol rate, a block interleaver 218 for correcting an error burst and a repeater 219 for matching a send data symbol rate and are then transmitted to a spreading and modulating unit, shown in FIG. 3 and described below.

A paging channel 220 is a common channel used in case of an incoming message to the second communication station or for answering a request of the second communication station. A lot of paging channels 220 can exist. The data transmitted to the paging channel passes through a convolutional encoder 224, a symbol repeater 226 and a block interleaver 228 and passes through an exclusive OR gate 236 together with an output of a long code generator 232 generated by a long code mask 230. The data through the exclusive OR gate 236 is then transmitted to the spreading and modulating unit of FIG. 3.

A traffic channel 240 in FIG. 2b is a channel dedicatedly allocated to each second communication station for use until the call is completed. When there are data to be transmitted to each second communication station, the first communication station transmits the data through the traffic channel 240. The data from the traffic channel 240 passes through a cyclic redundancy check (CRC) 241 for inspecting an error in a specific time unit, or frame, (e.g. 20 ms in IS-95). Tail bits 242 are inserted into the traffic channel, all of which are "0", and the data through the CRC 241 passes through a convolutional encoder 244 to ensure the independent encoding of the channel in a frame unit. The data then passes through a symbol repeater 246 to match the transmission data symbol rate according to a send data rate. After passing through the symbol repeater 246, the data passes through a block interleaver 248 to change an error burst into a random error. The data passing through the block interleaver 248 are scrambled in a scrambler 256 with use of a pseudo-noise (PN) sequence, generated by passing an output of a long code generator 232 decimated in a decimator 234 with the use of a long code mask 250 generated by an electronic serial number (ESN) allocated to each second communication station. A PCB (page control block) position extractor 258 extracts a position where a command for controlling transmission power from the second communication station is inserted in the PN sequence decimated in the decimator 234. A punch and insert 260 punches a data symbol corresponding to the insert position of the power control command extracted by the PCB position retractor 258 among the data symbols scrambled in the scrambler 256 and inserts the power control command, and then transmits the power control command to the spreading and modulating unit shown in FIGS. 3a-3c.

FIGS. 3a, 3b and 3c show an embodiment of a spreading and modulating unit according to the prior art.

FIG. 3a corresponds to the commonly used IS-95 method employing BPSK (Binary Phase Shift Keying) as a data modulating method. FIG. 3b shows the spreading and modulating unit employing QPSK (Quadrature Phase Shift Keying) as a data modulating method for transmitting double data in comparison with the method in FIG. 3a.

FIG. 3b illustrates the CDMA 2000 method, which is a candidate technique for the IMT-2000. FIG. 3c shows a spreading and modulating unit, which employs QOC (Quasi-Orthogonal Code) used in CDMA 2000, which is also a candidate technique for the IMT-2000. In FIG. 3, signal converters 310, 326, 330, 346, 364 convert logic signals "0" and "1" into physical signals "+1" and "−1" to be transmitted. Each channel of FIG. 2 passes through the signal converters and is then spread in spreaders 312, 332 by an output of a Walsh code generator 362. Transmission power of each channel is adjusted in amplifiers 314, 334. All channels of the first communication station are spread in spreaders 314, 334 by an orthogonal Walsh function of the Walsh code generator 362 fixedly allocated to each channel. The channels are then amplified in the amplifiers 314, 334 and then pass through QPSK spreading and modulating units 318, 338. Signals spread and modulated in the QPSK spreading and modulating units 318, 338 are multiplied by a carrier in multipliers 322, 342 to transmit to a sending band through low-pass filters (LPF) 320, 340. The signal multiplied by the carrier passes through a radio communication unit and is then transmitted through an antenna, not shown in the figures.

FIG. 3b is identical to FIG. 3a except that, in order to transmit the signal generated in FIG. 2 to QPSK instead of BPSK, different information data are carried in an in-phase channel and a quadrature phase channel through a demultiplexer 390. Using the demultiplexer 390 and the signal converters 310, 330 enables QAM (Quadrature Amplitude Modulation) as well as QPSK.

FIG. 3c shows the case that a QOC mask is used for distinguishing a channel from the first communication station to the second communication stations. Orthogonality is not maintained in a code symbol group using different QOC masks but maintained in a code symbol group using same QOC mask. Therefore, the present invention is applied to the orthogonal code symbol group using same QOC mask, which may maintain the orthogonality.

FIGS. 4a, 4b and 4c show signals used in the code division multiplexing, which spreads the signal generated in FIG. 2 and FIG. 3 into the orthogonal code symbol fixedly allocated to each channel, according to the prior art. A pilot channel 410 is spread by a fixedly allocated orthogonal Walsh code symbol W#0 in a spreader 412. Other channels are also spread by orthogonal Walsh code symbols W#1, W#2, . . . W#29, W#30, . . . W#63 fixedly allocated regardless of activities of the corresponding channels. If allocating the orthogonal code symbol fixedly to a channel such as channels 440, 450, 460 having relatively low transmission data activity, utilization of the orthogonal code, which is a limited source, is much less than 100%.

FIG. 4b shows how a despreading data symbol is spread by the orthogonal code. In reference numbers 471 to 477, white areas mean "0[+1]" and black areas mean "1[−1]", for the Walsh code as an example of the orthogonal code.

FIG. 4c shows that the orthogonal code symbols are allocated to each channel in OCDM.

FIG. 5 briefly shows a configuration of a receiver of the second communication station corresponding to the transmitter of the first communication station according to the prior art. As shown in the figure, the signal received through the antenna passes through multipliers 510, 530 for multiplying the signal with a carrier, low pass filters (LPFs) 512, 532 for generating a baseband signal and short code generators 520, 540 for synchronizing the signal with a sequence same as the PN sequence used in the transmitter. The signal then passes through multipliers 514, 534 for multiplying the signal by the received baseband signal and then despreaders 516, 536 for accumulating the signals during a transmission data symbol area. A channel estimator 550 estimates a transmission channel by extracting only pilot channel components from the baseband signal as the orthogonal code symbol allocated to the pilot channel. A phase recovery 560 compensates phase distortion of the baseband signal with use of an estimated phase distortion value.

FIG. 6 shows a configuration of a receiver for a channel in which a control command for controlling transmission power from the second communication station to the first communication station like the paging channel is not inserted. Referring to the figure, maximum ratio combiners 610, 612 combine signals passing through the phase compensation to a maximum ratio. If the receiver performs QPSK data modulation as shown in FIG. 3b, the receiver performs descrambling by multiplexing the signal in a multiplexer 614, performing soft decision in a soft decision unit 616, then decimating an output of a long code generator 622 generated by a long code mask 620 in a decimator 624, and then multiplying the signal through the soft decision unit with a decimated result of the decimator 624. In the present invention, a configuration of a receiver in the second communication station for the orthogonal code hopping multiplexing is similar to the configuration in FIG. 6. For the synchronous channel, the descrambling processes 620, 622, 624, 626, 628 using the long code may be skipped.

FIG. 7 shows a configuration of a receiver to which a control command controls a transmission power from the second communication station to the first communication station like the traffic channel. As shown in the figure, the signal enduring the phase compensation in FIG. 5 passes through maximum ratio combiners 710, 712. In the case that a receiver performs a QPSK data modulation as shown in FIG. 5, a multiplexer 714 multiplexes an in-phase component and an orthogonal phase component in the signal. An extractor 740 extracts a signal component corresponding to the power control command transmitted from the first communication station among the received signal. The signal from the extractor 740 then passes through a hard decision unit 744 and is then transmitted to a transmission power controller of the second communication station. Data symbols, except the power control command in the received signal from the multiplexer 714, pass through a soft decision unit 742. A decimator 724 decimates an output of a long code generator 722 generated by a long code mask 720 generated by an identifier of the second communication station. The data symbols from the soft decision unit 742 are then multiplied in a multiplier 718 by a result of the decimator 724, so as to perform descrambling.

FIG. 8 shows a function of recovering the received signal through the signal processes of FIG. 6 and FIG. 7 from the first communication station, through block deinterleavers 818, 828, 838 and convolutional decoders 814, 824, 834. In a synchronous channel 810, in order to lower a symbol rate, a sampler 819 performs a symbol compression for the signals through the soft decision unit by accumulating the signals, which is an inverse process to the symbol repeater 219. The signal through the sampler 819 passes through a block interleaver 818. Then, a sampler 816 performs the symbol compression again for the signal, which is an inverse process to the symbol repeater 216, before the signal passes to a convolutional decoder 814. The signal enduring the symbol compression then passes through the convolutional decoder 814, recovering the synchronous channel transmitted from the first communication station.

In the case of a paging channel 820, the signal enduring the soft decision passes through a block deinterleaver 828 for channel interleaving. The signal enduring the channel interleaving passes through a sampler 826 for symbol compression according to the send data rate, which is an inverse process of the symbol repeater 226. The signal enduring the symbol compression passes through a convolution decoder 824 for channel decoding, recovering the paging channel transmitted from the first communication station.

In the case of a traffic channel 830, the signal enduring the soft decision passes through a block deinterleaver 838 for performing channel deinterleaving regardless of a send data rate. The signal enduring the channel interleaving passes through a sampler 836 for performing symbol compression according to the send data rate, which is an inverse process to the symbol repeater 246. A convolutional decoder 834 performs a channel decoding for the signal enduring the symbol compression. A tail bit remover 832 removes tail bits of the signal used for the independently send signal generated in a frame unit. A CRC 831 generates a CRC bit for the send data portion like the transmitter and inspects errors by comparison with a recovered CRC after channel decoding. If the two CRC bits coincide, the CRC 831 determines that there is no error, and then, the traffic channel data is recovered. If the transmitter does not include information about the send data rate in 20 ms frame unit, the send data rate of the first communication station may be determined by channel-decoding the signals enduring the independent channel deinterleaving and comparing the CRC bits. A system, which transmits a send data rate independently, just further requires a channel decoding process corresponding to the data rate.

In case of spreading the despreading data symbol by fixedly using the orthogonal code allocated when establishing a call as shown in FIG. 3 in order to maintain orthogonality between channels from the first communication station to the second communication station as shown in FIG. 1, the orthogonal code, limited source, may not be efficiently used for sending data having a relatively low activity, such as data indicated by reference numbers 440, 450 and 460 in FIG. 4*a*. In order to increase the activity of the orthogonal code with fixed allocation, rapid channel allocation and return are required. However, if transmitting the control signal information for channel allocation and return more frequently, more significant amounts of limited frequency resources should be used for the control information of the data transmission, not for the data transmission itself. Moreover, however rapid the channel allocation and return are processed, there should be a buffering process after the data to be transmitted reaches the first communication station until transmitted in order to transmit a channel allocation (or return) message and respond to the message. As the time for such processes is extended, more capacity is required in the buffer. Information, which requires checking whether the information is transmitted normally, should be buffered for retransmission. However, in the case of transmitting information without checking normal transmission of the information, such as, in a datagram method, a delay should be minimized in an allowable range in order to decrease the capacity of the buffer.

Therefore, while the prior art allocates the orthogonal codes in a fixed manner so as to have a 1:1 relation between the orthogonal code and the channel, the present invention, with a little modification of the prior art, performs statistical multiplexing for traffic channels having low activities in consideration of activity of the sent data in order to increase the activities of the orthogonal codes, which are limited resources, and to eliminate unnecessary channel allocating and returning processes in order to decrease the buffer capacity and data transmission delay.

DISCLOSURE OF INVENTION

The present invention is designed to overcome the above problems of the prior art. An object of the invention is to decrease the waste of resources caused by the transmission of unnecessary control signals, minimize a required capacity of a buffer in a first communication station used for time division multiplexing and reduce a data transmission delay by means of efficiently utilizing the limited resources with the use of a statistical multiplexing method, namely orthogonal code hopping multiplexing, when synchronized channels maintaining orthogonality have low activities, and performing spreading or despreading according to a hopping pattern of each transmitter and receiver by skipping unnecessary channel allocating and returning processes.

In order to accomplish the above object, the present invention provides a method for orthogonal code hopping multiplexing communications in a band spreading communications system, which performs statistical multiplexing for communication channels from a first communication station to second communication stations by orthogonal code hopping multiplexing communications.

The channels from the first communication station to a plurality of the second communication stations may be synchronized to distinguish the channels by using orthogonality.

The method may include a further step of distinguishing the channels from the first communication station to the second communication stations with use of orthogonal code hopping patterns.

The orthogonal code may be a Hadamard code, a variable spreading factor code or a gold code.

The method may include a further step of allocating the orthogonal code hopping pattern to the second communication stations dedicatedly.

It is preferred that the orthogonal code hopping pattern is allocated to the second communication stations from the first communication station when starting communication, and the second communication stations give back the orthogonal code hopping pattern when the communication is completed.

The method may include a further step of performing the orthogonal code hopping multiplexing for a channel among the channels, which has a low transmission data activity.

The method may include a further step of transmitting a command for controlling transmission power of the second communication stations with use of a separate common power control channel of the first communication station.

The transmission power control command of each second communication station in the common power control channel can be time-multiplexed and may employ a collision-resistant hopping pattern to prevent collision of the hopping pattern.

The collision-resistant hopping pattern may include a fixed orthogonal code symbol allocation like a code division multiplexing.

The orthogonal code hopping patterns for the statistical multiplexing may be generated at random or with use of a pseudo-noise sequence generator.

A plurality of the orthogonal code hopping patterns for the statistical multiplexing are allocable to one of the second communication stations according to a send data rate of the first communication station.

Each of the orthogonal code hopping patterns may hop independently in the orthogonal code hopping multiplexing communications.

The orthogonal code hopping patterns may hop not to generate collision each other in the orthogonal code hopping multiplexing communications and may be periodically repeated in a frame unit.

The frame unit is an independent data unit based on channel encoding.

The first communication station may detect a hopping pattern collision caused by the random orthogonal code hopping patterns in advance in order not to transmit a corresponding despreading data symbol.

The method may include a further step of comparing despreading data symbols at time of a hopping pattern collision caused by the random orthogonal code hopping patterns in order to transmit the data symbols in case that all of the data symbols are same.

The method may include a further step of comparing despreading data symbols at time of a hopping pattern collision caused by the random orthogonal code hopping patterns in order not to transmit the data symbols in case that the data symbols are not same.

The method may include a further step of increasing transmission power of a data symbol next to the data symbols, which are not transmitted because of discordance of the despreading data symbols at time of the hopping pattern collision.

It is also preferred that the transmission power is increased as much as an amount given by a system parameter during a period given by a system parameter.

The two system parameters may be position functions of the not-transmitted despreading data symbols and preferably at least 0.

Preferably, the hopping pattern collision is prevented only when there is a possibility that sending antenna beams of the first communication station, where the hopping patterns are collided, are superposed so as to cause a serious error in a channel decoding process of the second communication station.

A pilot signal can be used for initial synchronous gain and tracking of the channels and synchronous decoding of the channels owing to phase distortion compensation.

The pilot signal may employ a non-collision hopping pattern for preventing a loss of the phase distortion compensation ability due to collision.

The non-collision hopping pattern may include a fixed orthogonal code symbol allocation like the code division multiplexing.

In order to obtain the above object, the present invention provides a transmitter in a band spreading communications system including a first communication station and a second communication station, the transmitter comprising a channel encoder for coding a channel; an orthogonal code hopping pattern generator for generating an orthogonal code hopping pattern; an orthogonal code generator for generating an orthogonal code symbol according to the hopping pattern; and an orthogonal code collision detector for detecting collision of the hopping patterns.

The transmitter may further include an interrupter for interrupting a send signal according to output of the orthogonal code collision detector.

The orthogonal code collision detector may include a despreading data symbol comparator for determining that all despreading data symbols of corresponding channels are the same at the time of a hopping pattern collision; and the interrupter may interrupt transmission of the sending signal in case that the corresponding despreading data symbols are not same as a comparison result of the despreading data symbol separator.

In order to accomplish the above object, the present invention provides a receiver in a band spreading communications system including a first communication station and second communication stations, the receiver comprising a channel decoder for decoding a channel; an orthogonal code hopping pattern generator for generating an orthogonal code hopping pattern; and an orthogonal code generator for generating an orthogonal code symbol according to the hopping pattern.

In order to perform the above object, the present invention also provides a method for band spreading communications in a band spreading communications system using orthogonal codes, the method comprising the step of dividing the orthogonal codes into a first orthogonal code symbol group for code division multiplexing and a second orthogonal code symbol group for statistical multiplexing owing to orthogonal code hopping.

The method may include a further step of performing the code division multiplexing by fixedly allocating the orthogonal code symbols in the first orthogonal code symbol group to a channel having a high data activity in communications.

The method may include a further step of performing orthogonal code hopping multiplexing for a channel having a low data activity according to the orthogonal code hopping pattern by using only the orthogonal code symbols in the second orthogonal code symbol group.

The orthogonal code may be an orthogonal variable spreading factor code.

Preferably, the first orthogonal code symbol group consists of child codes generated from one parent code in a hierarchical orthogonal code generating tree structure according to the variable spreading factors, while the second orthogonal code symbol group consists of remained orthogonal code symbols.

The first orthogonal code symbol group used for the code division multiplexing may be selected to have a variable spreading gain according to a send data rate.

The channel for the orthogonal code hopping multiplexing may have a fixed data rate, and the method may include a further step of selecting orthogonal code symbols having the same spreading factor in the second orthogonal code symbol group.

BRIEF DESCRIPTION OF THE DRAWINGS

These and other features, aspects, and advantages of preferred embodiments of the present invention will be more fully described in the following detailed description, and accompanying drawings. In the drawings:

FIG. 10a shows a configuration of a transmitter in the first communication station using the orthogonal code hopping multiplexing according to the present invention, corresponding to FIG. 4a;

BEST MODES FOR CARRYING OUT THE INVENTION

Hereinafter, preferred embodiments of the present invention will be described in detail with reference to the accompanying drawings.

In this application, similar reference numbers are used for components similar to the prior art and only modified or added components in comparison with the prior art are described for the present invention in detail.

Figure 9:
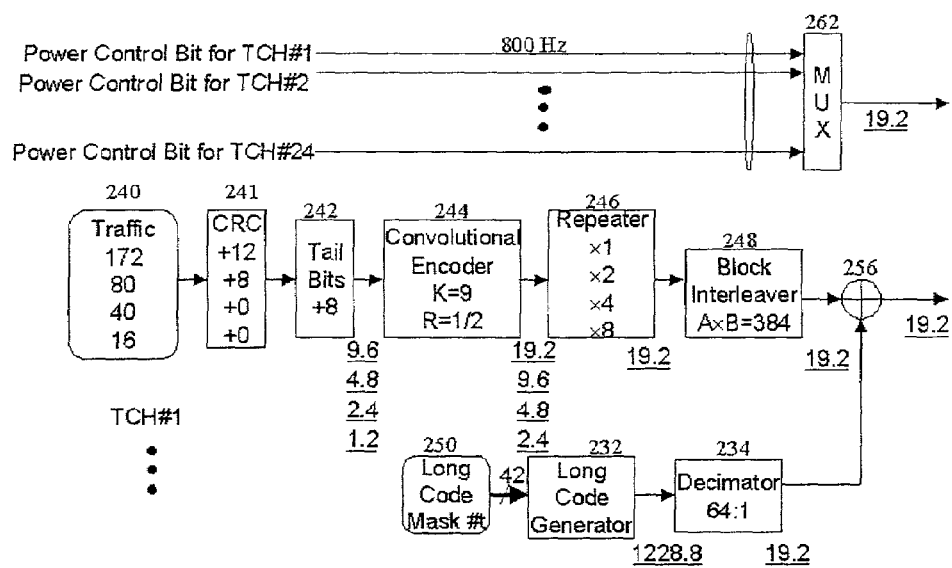
FIG. 9 shows a configuration of a transmitter in the first communication station about traffic channels for orthogonal code hopping multiplexing and a configuration of a common power control channel for the traffic channels.

FIG. 9 is a modified one of the traffic channel of the prior art for performing orthogonal code hopping multiplexing in the case of having a low send data activity, which is identical to the prior art except that a transmission power control command for the second communication station is inserted. Communication is divided into a bi-directional communication and a one-directional communication, in which the one-directional communication does not need the transmission power control command for the second communication station.

However, in the case of the bi-directional communication, the transmission power control command is required in order to maximize the system capacity through effective power control. For improving a processing rate, the power control command does not endure channel coding in most cases. A random orthogonal code hopping pattern inevitably causes collisions between each other channels. Therefore, it is required to transmit the power control command to a channel in which a collision is generated. In this point, a concept of a common power control channel adapted in CDMA 2000, which is one candidate technique for the IMT-2000, may be introduced. The common power control channel is spread by a separate orthogonal code symbol, such as the pilot channel, and transmitted by the same division multiplexing for a plurality of the second communication stations. A position of the power control command for each second communication station is allocated in a call establishing process. FIG. 9 shows an embodiment of the common power control channel for controlling 24 second communication stations.

Figure 1:
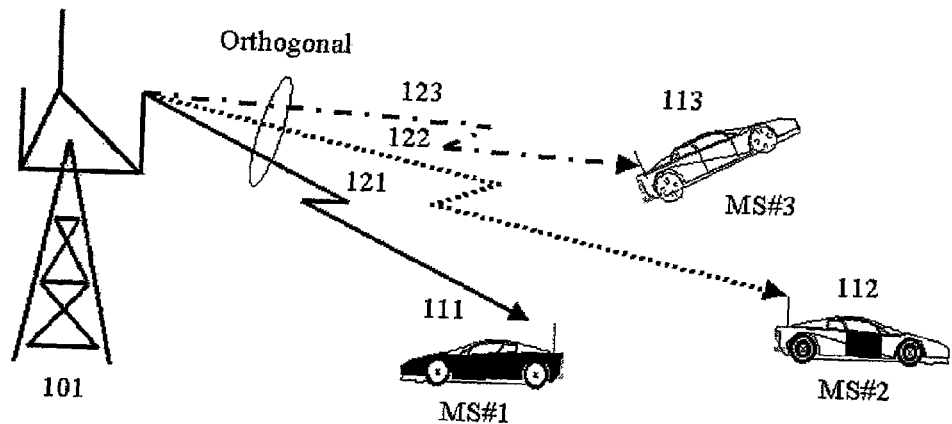
FIG. 1 shows a concept of a system having a first communication station and second communication station according to both the prior art and the present invention.
Figure 2A:
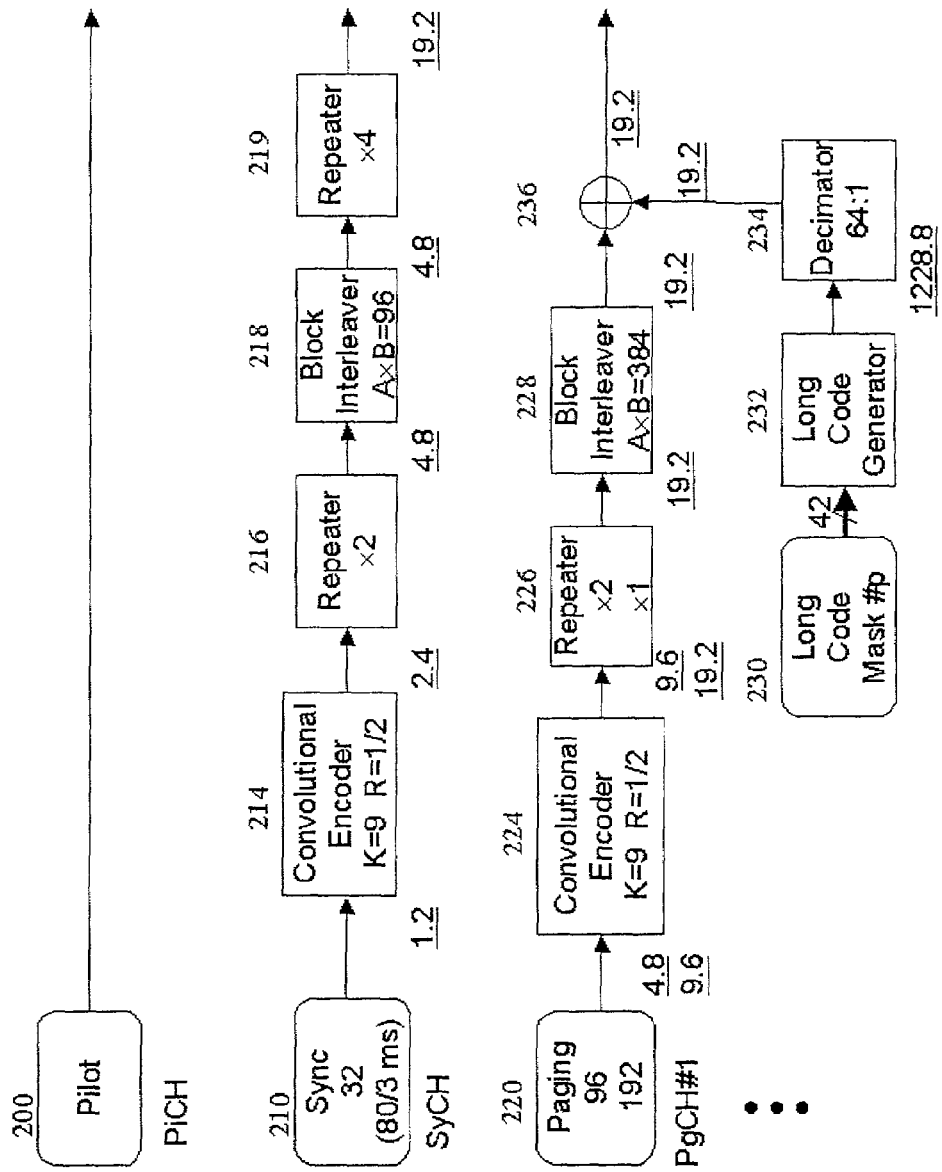
FIG. 2a shows a configuration of a transmitter in the first communication station, which is a common component of the prior art and the present invention.
Figure 2B:
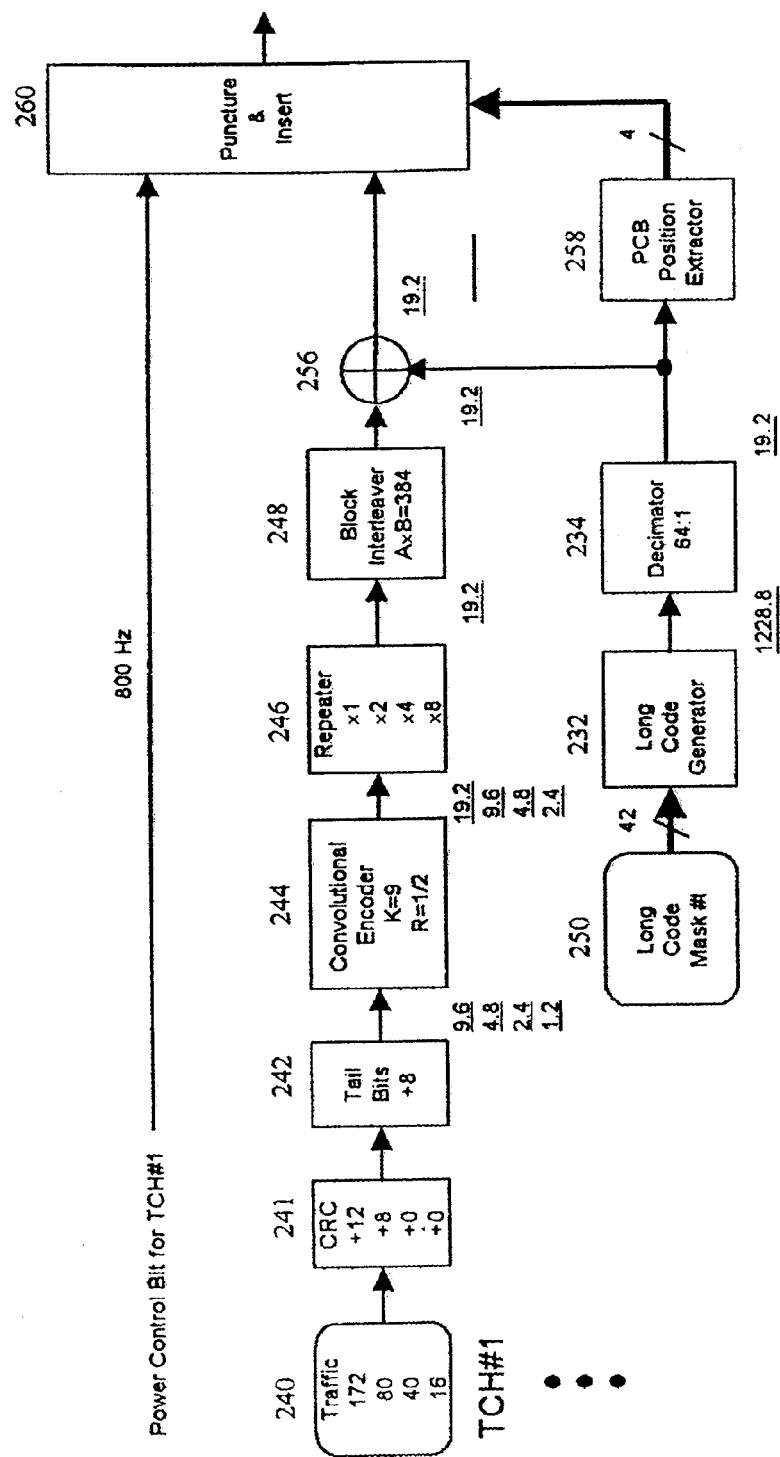
FIG. 2b shows a configuration of a transmitter for traffic channels in the first communication station according to the prior art.
Figure 3A:
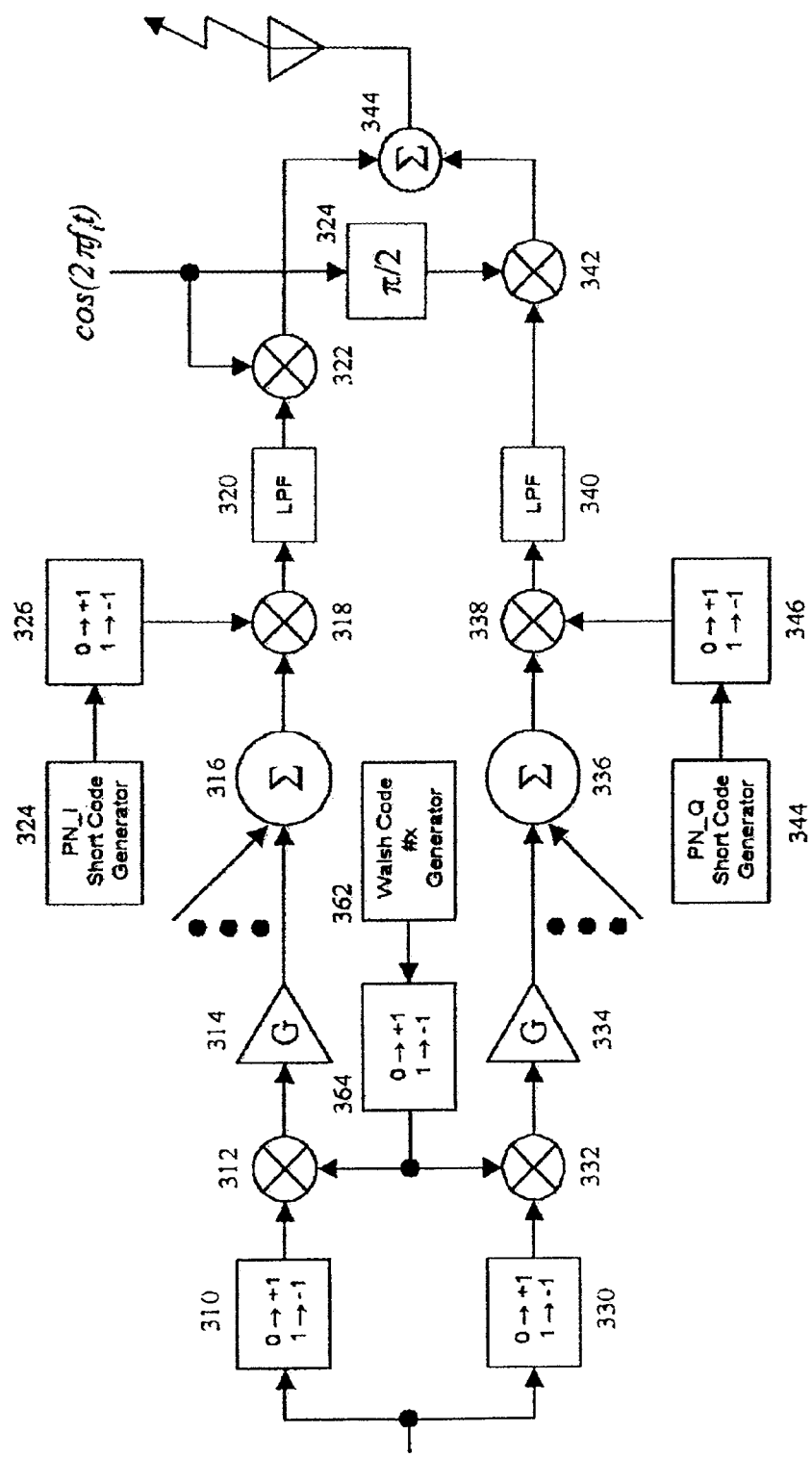
FIG. 3a shows a configuration of a receiver in the first communication station using a CDMA method in case of BPSK data modulation according to the prior art.
Figure 3B:
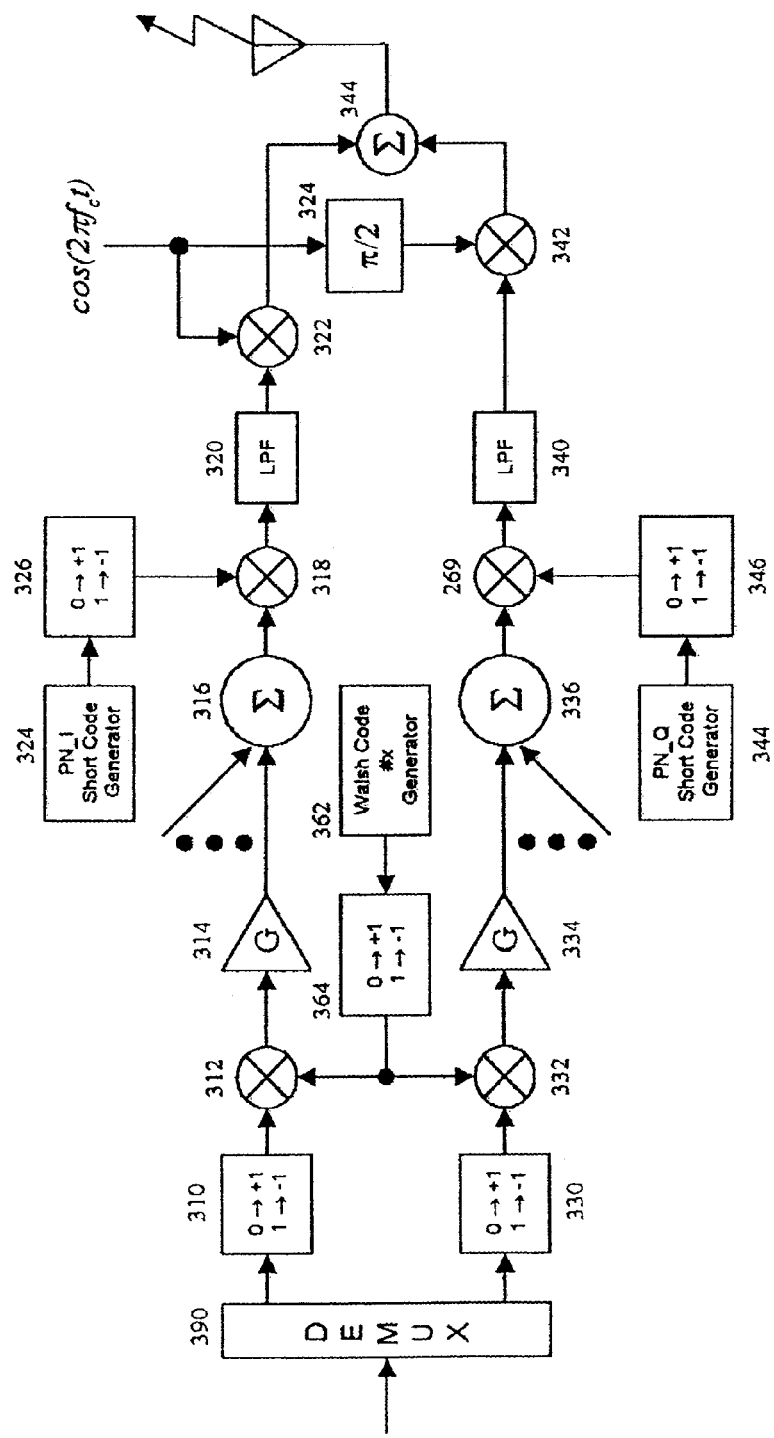
FIG. 3b shows a configuration of a receiver in the first communication station using a CDMA method in case of QPSK data modulation according to the prior art.
Figure 3C:
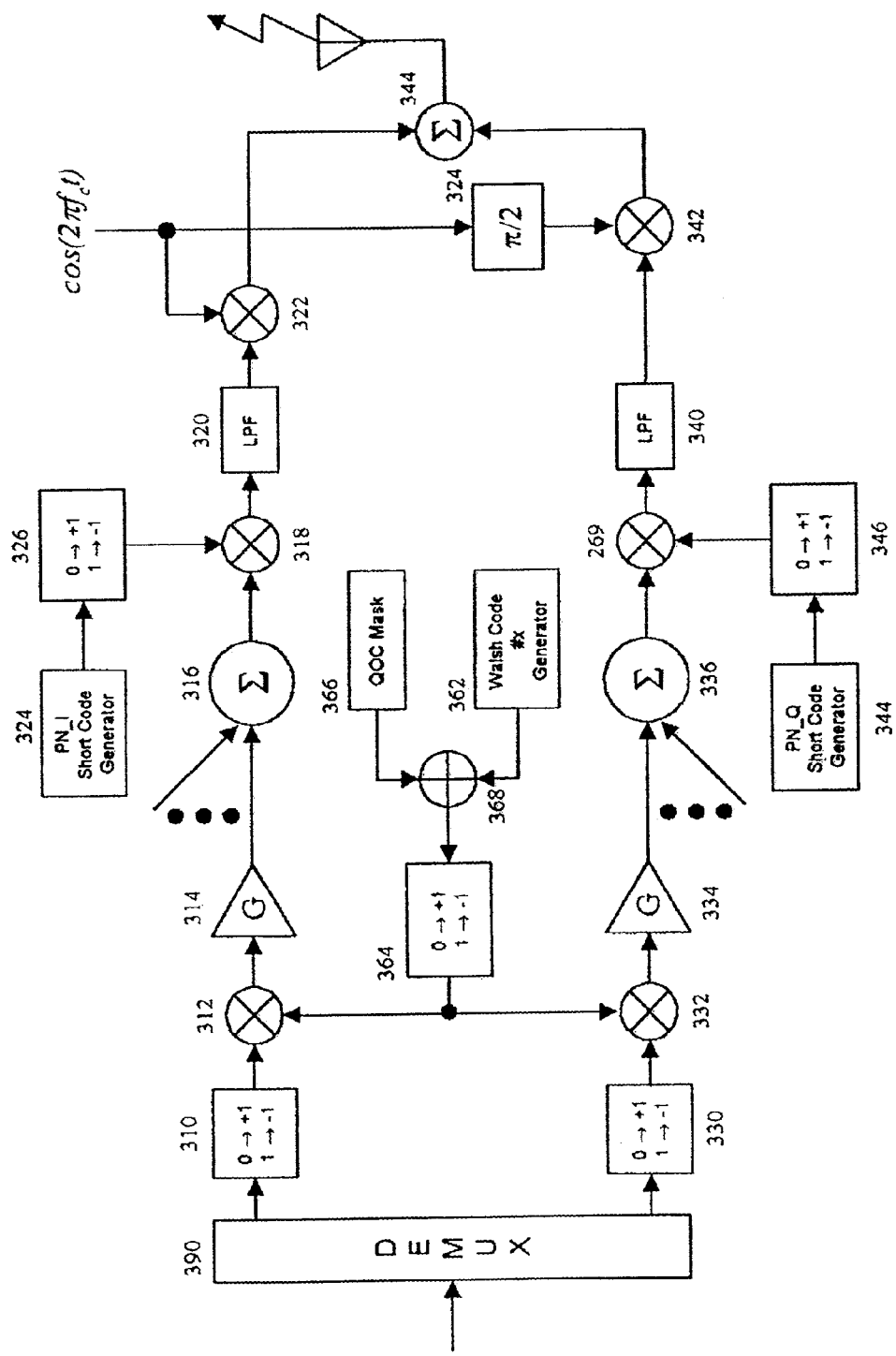
FIG. 3c shows a configuration of a receiver in the first communication station using a CDMA method in case of using QOC data according to the prior art.
Figure 10A:
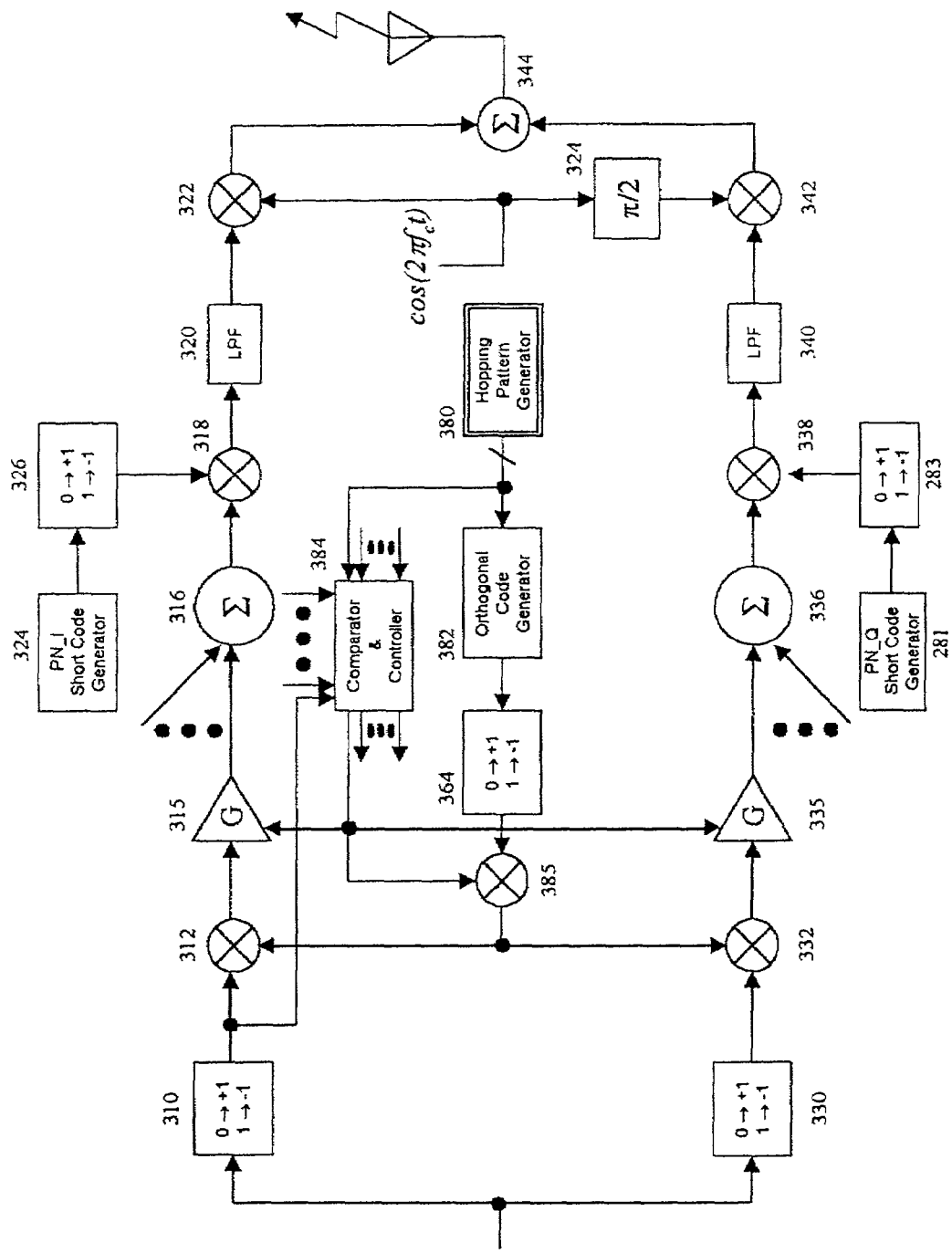
Figure 10B:
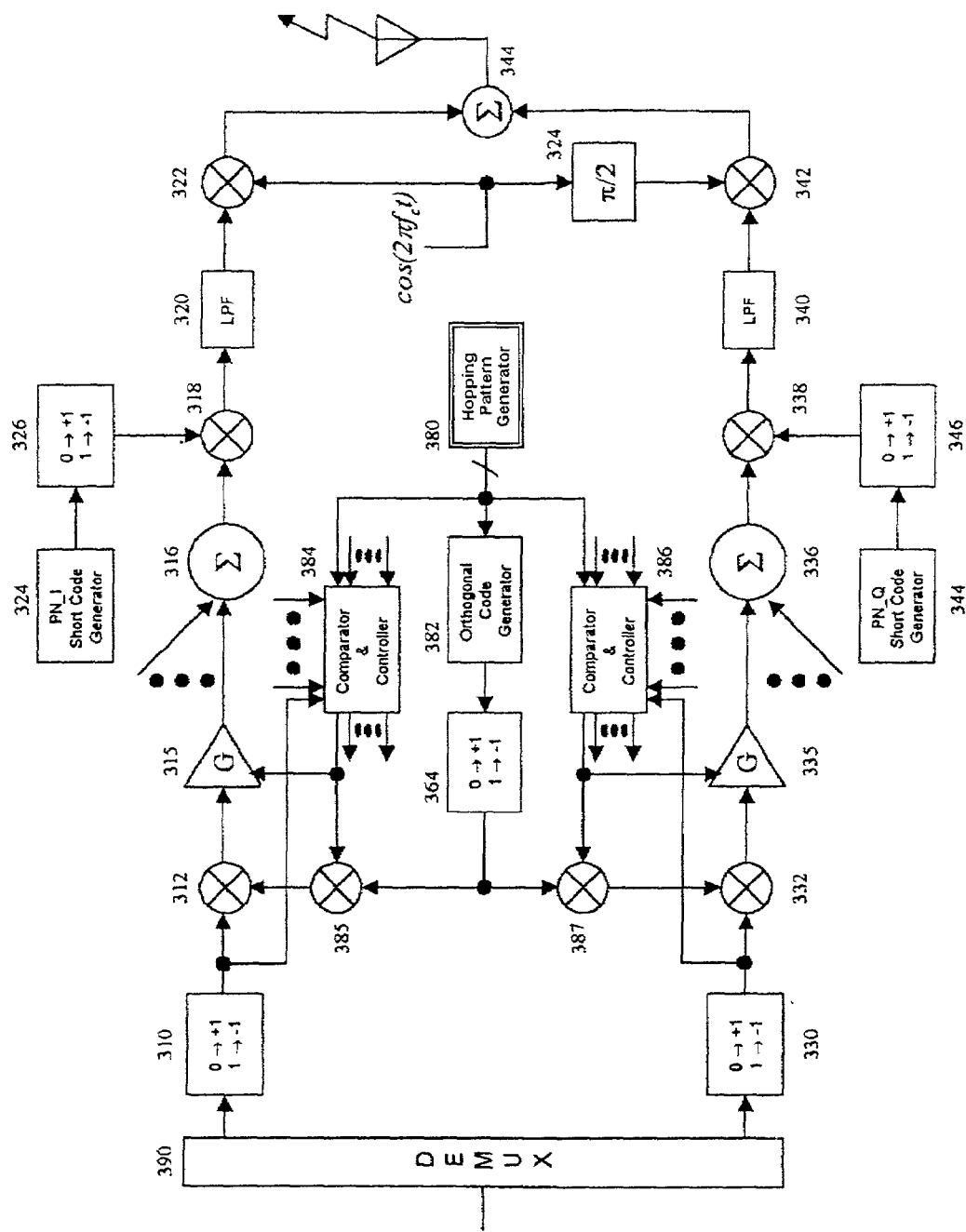
FIG. 10b shows a configuration of a transmitter in the first communication station using the orthogonal code hopping multiplexing according to the present invention, corresponding to FIG. 4b.
Figure 10C:
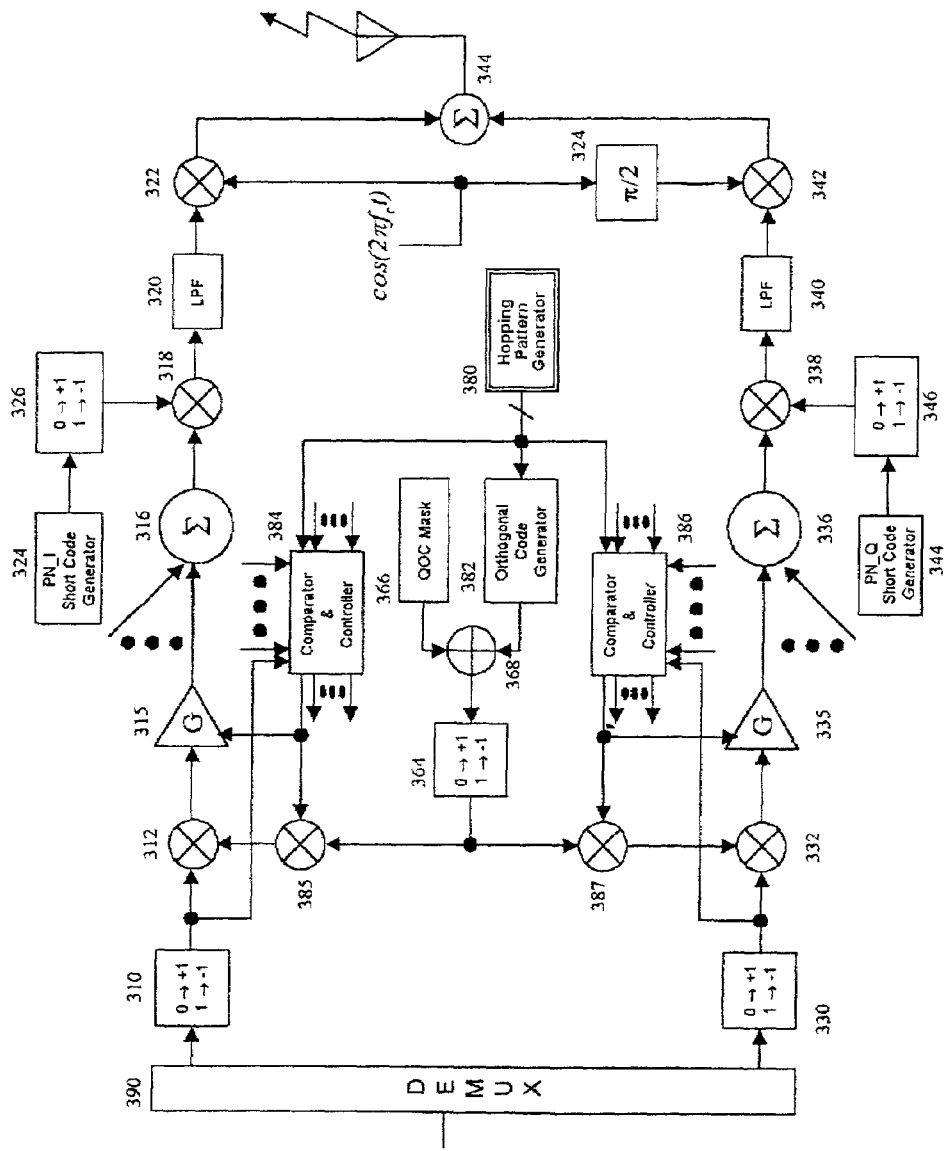
FIG. 10c shows a configuration of a transmitter in the first communication station using the orthogonal code hopping multiplexing according to the present invention, corresponding to FIG. 4c.
Figure 11:
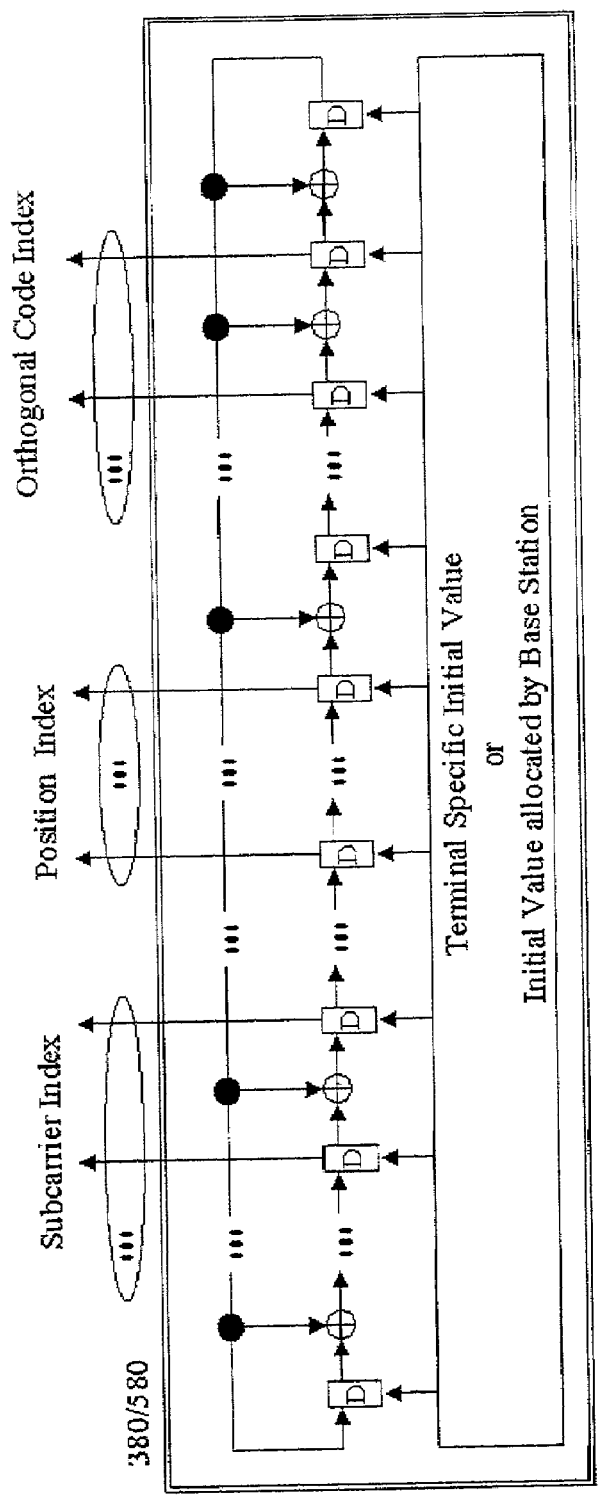
FIG. 11 shows a configuration of an orthogonal code hopping pattern generator according to the present invention.
Figure 12:
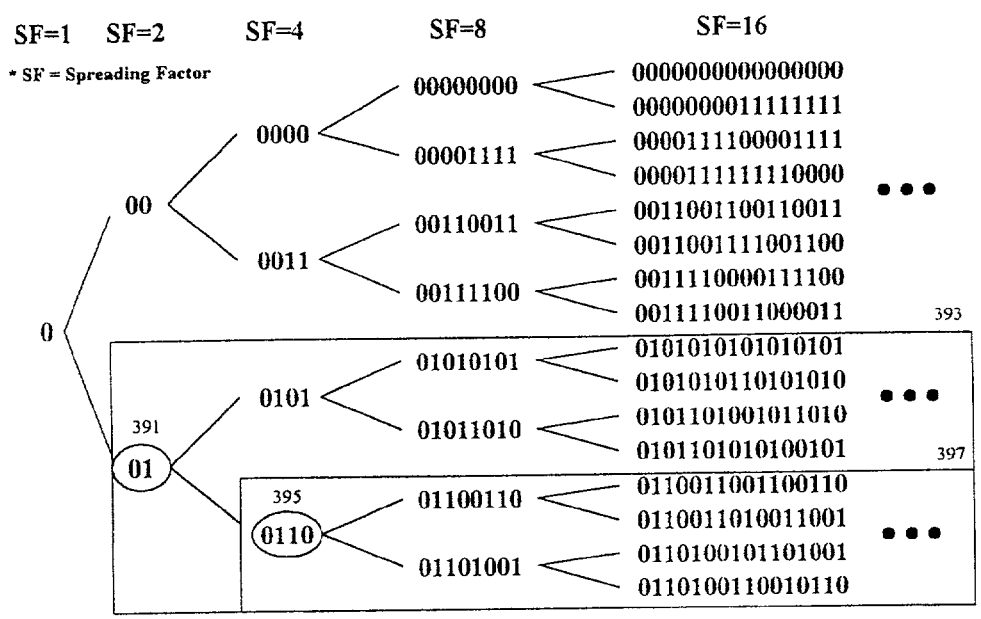
FIG. 12a shows an example of an orthogonal variable spreading factor code according to the present invention.
FIG. 12b shows an orthogonal gold code generator according to the present invention.
Figure 13:
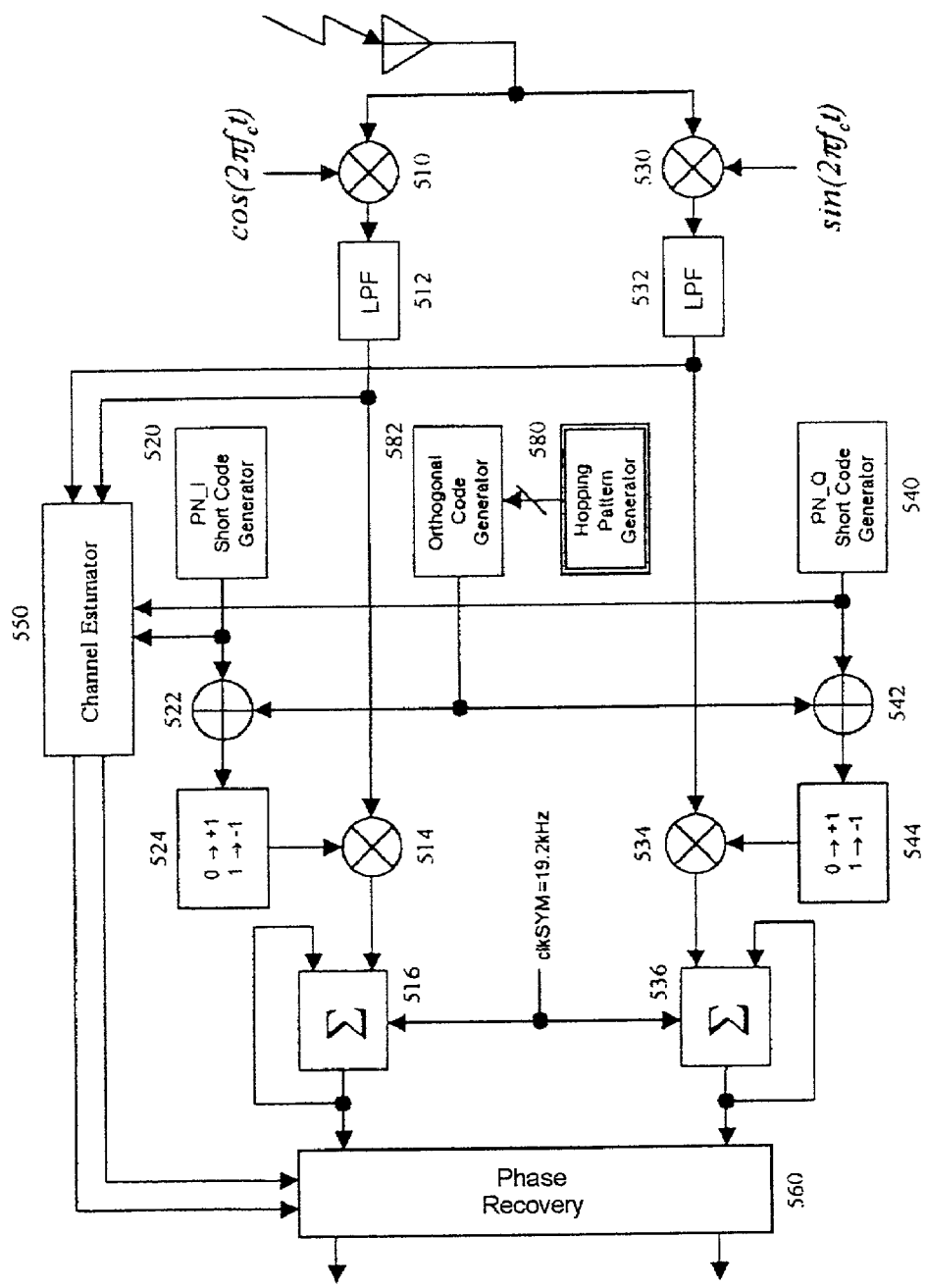
FIG. 13 shows a configuration of a receiver in the second communication station in the orthogonal code hopping multiplexing of FIG. 10b according to the present invention.

FIGS. 10*a*, 10*b* and 10*c* show embodiments to which characteristics of the present invention are applied to the prior art shown in FIGS. 3*a*, 3*b* and 3*c*. For statistical multiplexing by the orthogonal code hopping multiplexing suggested in the present invention, an orthogonal code hopping pattern generator 380 and collision comparator and controller 384, 386 for suitable control by detecting collisions of the orthogonal code symbols generated by the random hopping pattern generation are required. An example of the orthogonal code hopping pattern generator is shown in FIG. 11, which has a configuration for generating the hopping pattern with use of a general PN sequence generator. An orthogonal code generator 382 is required for generating a spreading orthogonal code symbol according to the hopping pattern generator 380. The orthogonal code generated in the orthogonal code generator 382 may be an orthogonal variable spreading factor (OVSF) having a hierarchical structure which can be a Walsh code for a specific spreading factor as shown in FIG. 12*a*, or an orthogonal gold code generated by an orthogonal gold code generator as shown in FIG. 12*b*. Any orthogonal code maintaining orthogonality is possible.

When an output of the orthogonal code hopping pattern generator 380 is constant, the orthogonal code division multiplexing is the same as with the prior art. That is, the orthogonal code division multiplexing of the prior art is a subset of the orthogonal code hopping multiplexing of the present invention. Therefore, after dividing one orthogonal code into two orthogonal code symbol groups, one orthogonal code group is used for an orthogonal code hopping multiplexing using a fixed allocation and the other orthogonal code group is used for an orthogonal code hopping multiplexing using a hopping pattern.

Or else, one orthogonal code symbol group among the two divided orthogonal code symbols performs the orthogonal code hopping multiplexing with use of a hopping pattern intentionally selected to prevent collision of the hopping patterns, while the other orthogonal code symbol group performs the orthogonal code hopping multiplexing by the statistical multiplexing with use of a hopping selected randomly in which a collision between the hopping patterns may happen.

In the two cases, it is preferred that the former is allocated to a channel having a relatively high send data activity and the later is allocated to a channel having a relatively low send data activity. In case of using a hierarchical orthogonal code supporting a variable spreading gain as a spreading code as shown in FIG. 12*a*, it is preferred to divide the orthogonal code into orthogonal code symbol groups 393, 397 consisting of all child code symbols having same parent code symbol 391, 395 such as "01" or "0110" because it may support the variable spreading gain. As described above in brief, if the orthogonal code hopping pattern generator intentionally generates the orthogonal code hopping patterns not to select different channels at same orthogonal code symbol in the same instant, no collision generates.

However, such method has disadvantages that the hopping pattern should be allocated by the first communication station in establishing a call and that number of the hopping patterns allocated by the first communication station is limited by a size of the orthogonal code. In this case, because the statistical multiplexing according to the data activity of each channel is not possible, hopping patterns are allocated to each channel independently and at random. In this reason, orthogonal code patterns, which select the same orthogonal code symbol at the same instant, make a collision inevitably. Therefore, the present invention receives hopping patterns of each channel and despreading data symbols to be transmitted and determines whether the hopping patterns collide with use of the collision comparator & controller 384, 386 for overcoming such problems. Besides that, the present invention compares whether the despreading data symbols of all channels corresponding to the collisions are all same.

In case that all despreading data symbols match, the data symbols in the collision area are spread and transmitted. It is because the data symbol may cause an error in the channel decoding process. However, if there is one data symbol not matched, the data symbol in the collision area of the corresponding channel is not transmitted. That is, according to a result of the collision comparator & controller 384, 386, an input of the multipliers 385, 387 becomes "+1" or "0". In the area that the input of the multiplier is "0", the transmission is stopped.

Figure 14A:
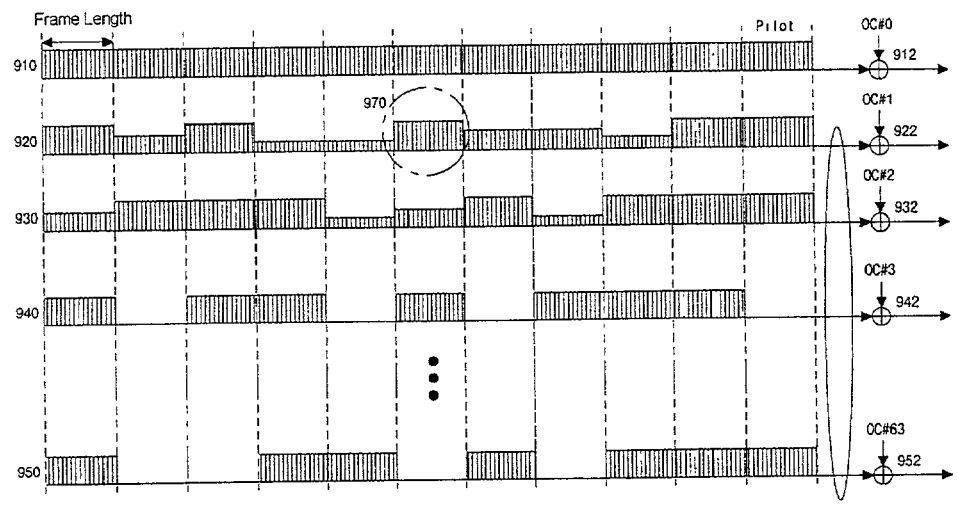
FIG. 14a shows a send signal when using the code division multiplexing for traffics toward the second communication station having relatively high send data activities.
Figure 14B:
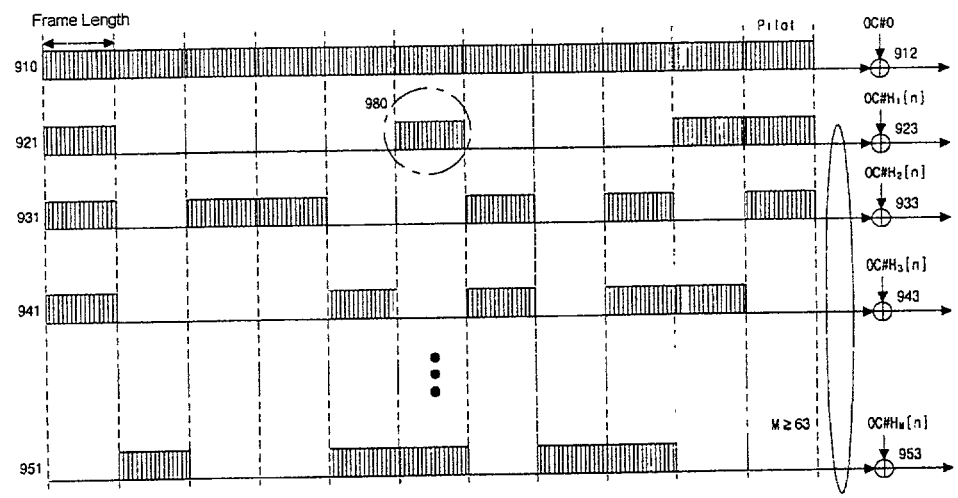
FIG. 14b shows a send signal when using the orthogonal code hopping multiplexing for traffics toward the second communication station having relatively low send data activities.
Figure 14C:
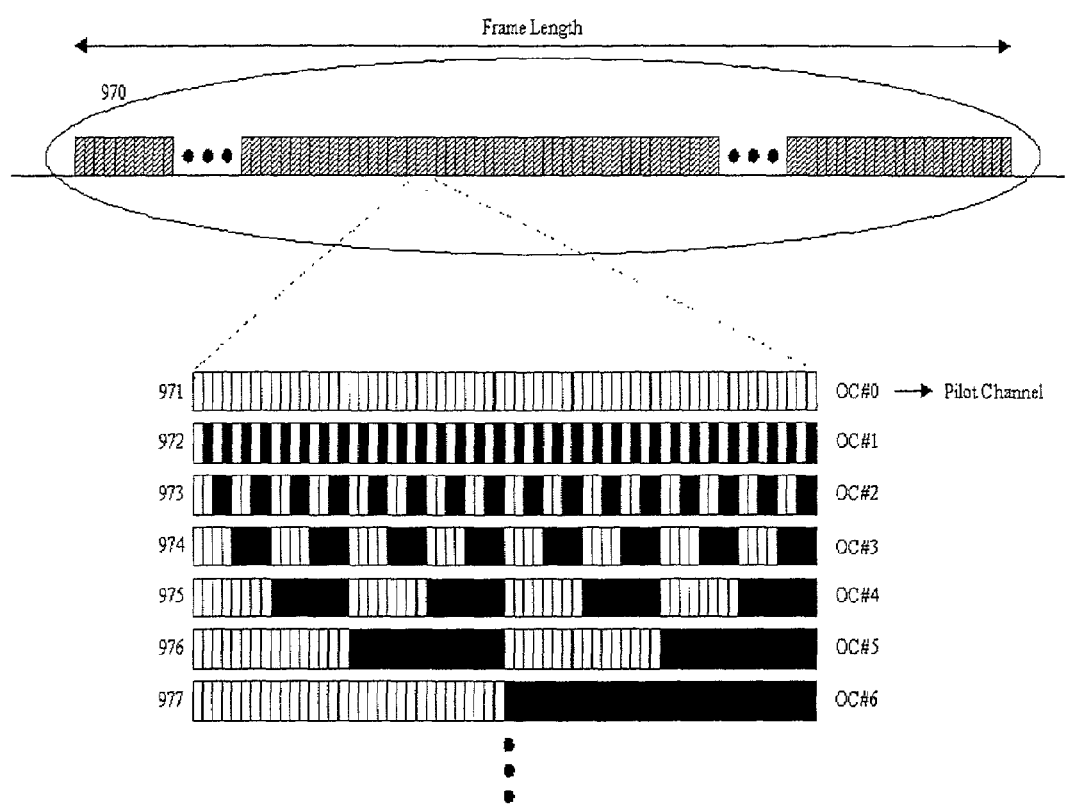
FIG. 14c shows the orthogonal spreading code of the present invention.
Figure 14D:
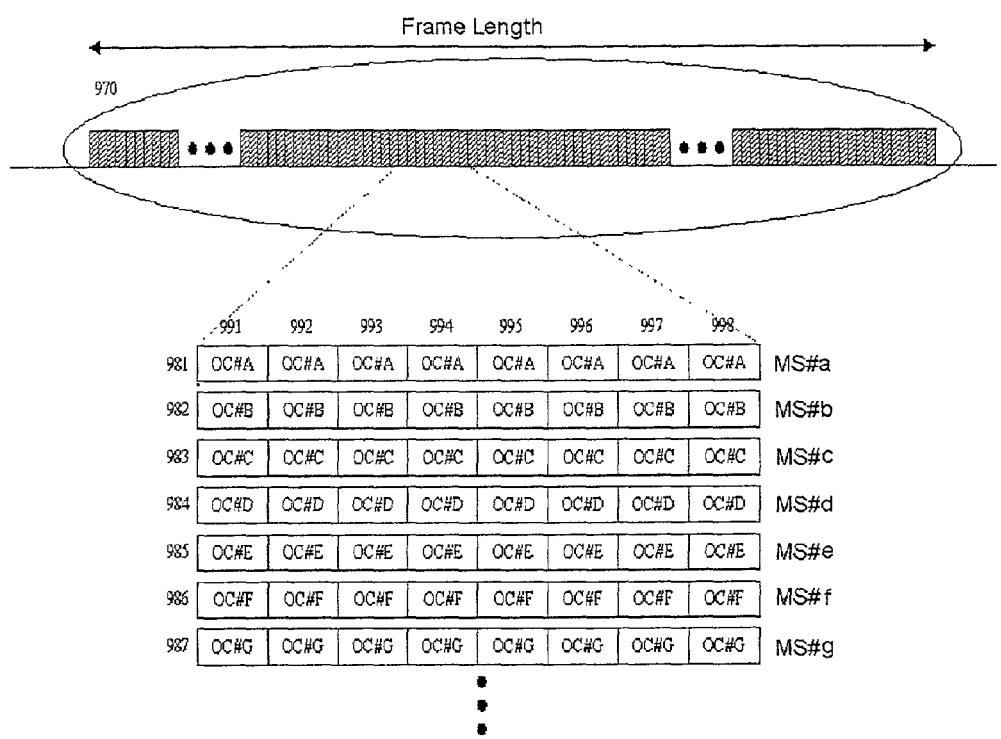
FIG. 14d shows the code division multiplexing of FIG. 14a according to the present invention.
Figure 14E:
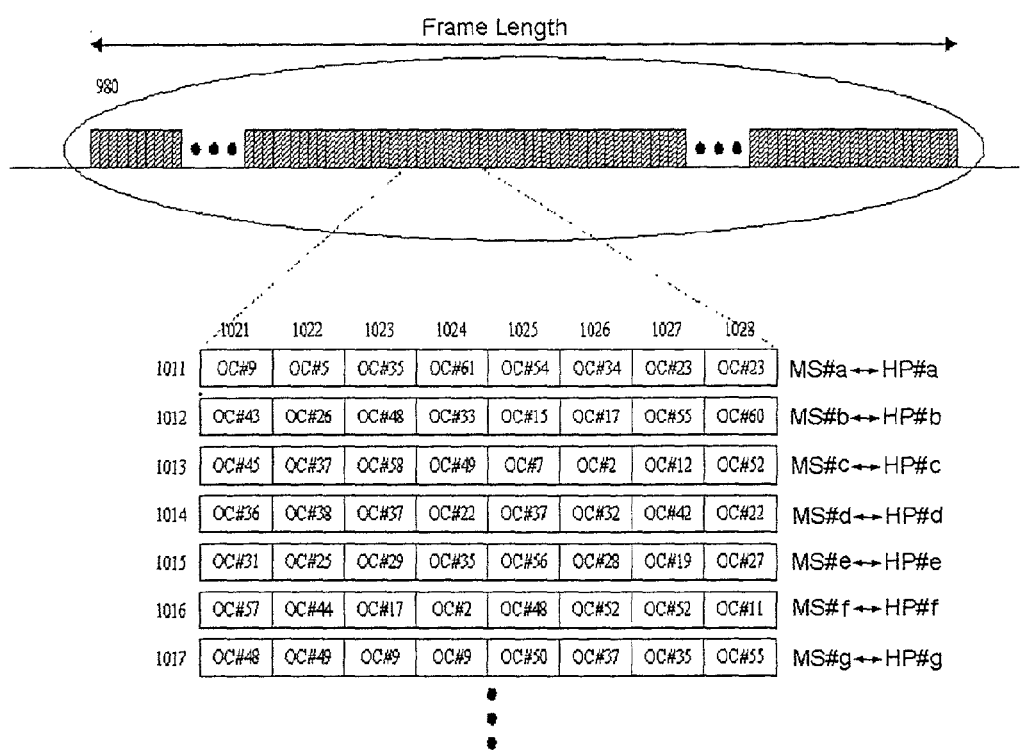
FIG. 14e shows the statistical multiplexing by the orthogonal code hopping multiplexing of FIG. 14b according to the present invention.
Figure 14F:
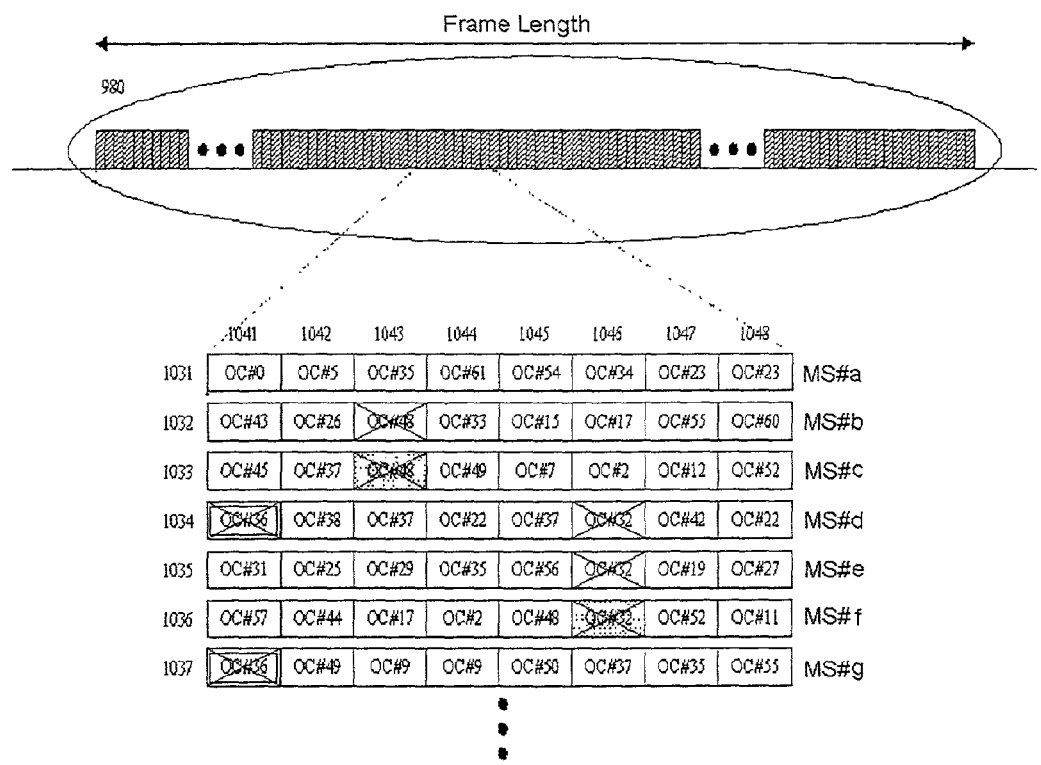
FIG. 14f shows hopping pattern collisions in case of the orthogonal code hopping multiplexing of FIG. 14b according to the present invention.
Figure 14G:
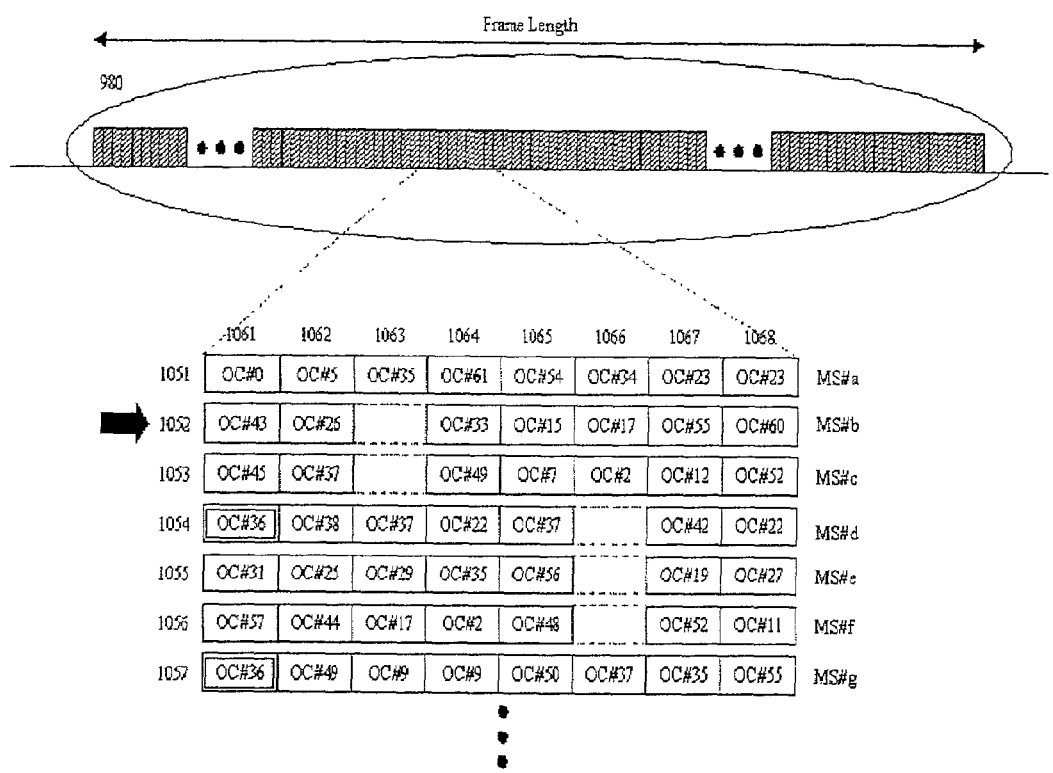
FIG. 14g shows transmission stopping in the collision area of relevant channels when the hopping patterns collide and send data symbols do not match as shown in FIG. 14f.
Figure 14H:
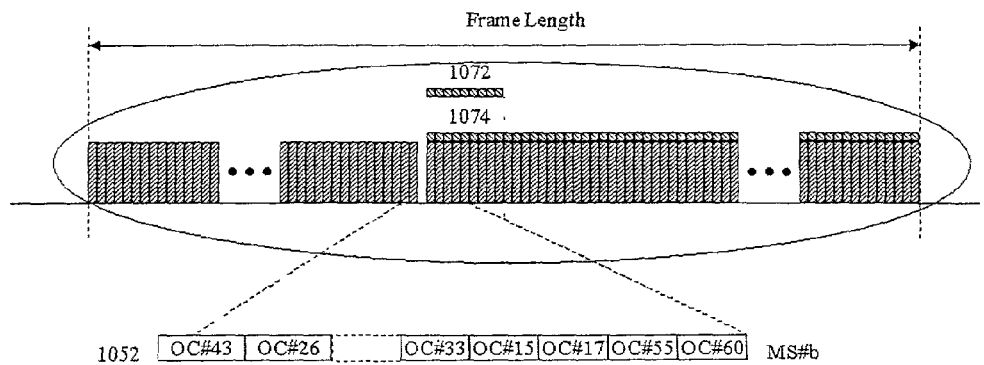
FIG. 14h shows the process of increasing transmission power of the first communication station in a certain area after a data symbol not transmitted in order to compensate average receiving energy required for a channel decoder for satisfied communication quality when stopping transmission in the hopping pattern collision area in FIG. 14g.
Figure 15:
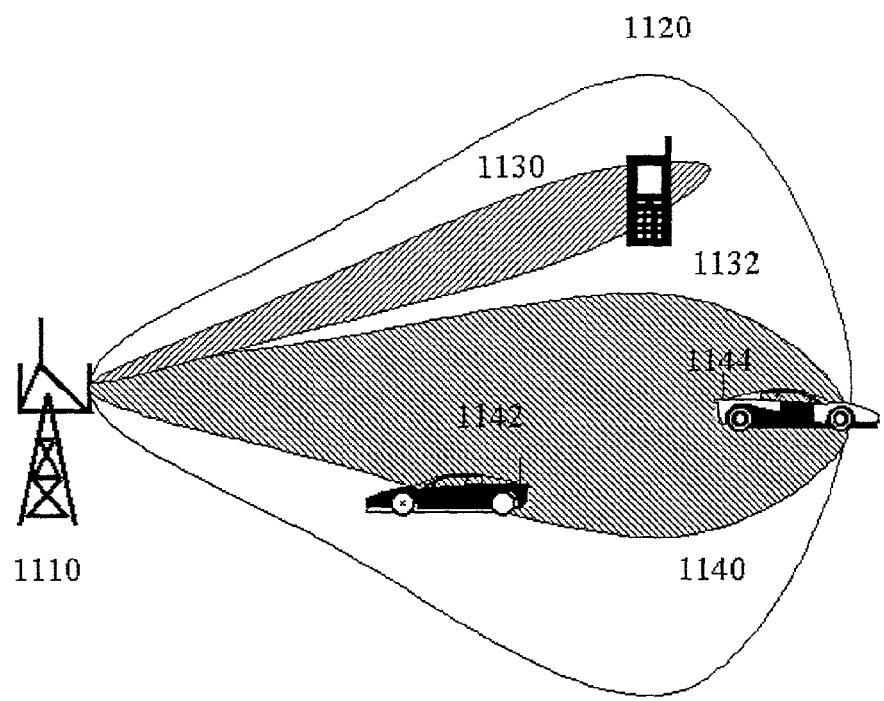
FIG. 15 is a diagram for illustrating that transmission stopping caused by the hopping pattern collision and mismatch of the send data symbols is independently operated for each send antenna beam of the first communication station.

In order to compensate for the deficiency of an average receiving energy in the second communication station due to a transmission stop of the despreading data symbol for satisfied quality, a gain of amplifiers 315, 335 of the corresponding channel is adjusted as much as a size given by a system parameter during an area given by a system parameter like the reference numbers 1072, 1074 in FIG. 14*h*, then increasing the transmission power of the first communication station. Regardless of the above process, the transmission power control for the first communication station is performed according to the method of the prior art.

FIGS. 14*a* to 14*h* show concepts of a send signal of the first communication station according to the present invention. FIG. 14*a* shows a send signal in case of performing the code division multiplexing by fixedly allocating the orthogonal code symbols to a channel which transmits data having a relatively high activity. FIG. 14*b* shows a send signal in case of performing the orthogonal code hopping multiplexing to select a spreading orthogonal code symbol according to hopping patterns $H_1[n]$, $H_2[n]$, $H_3[n]$, ..., $H_M[n]$ for a channel which transmits data having a relatively low activity. The number of the hopping patterns may be over a size of the orthogonal code. Because the hopping patterns may cause collision when generating the hopping patterns at random, it is preferred that the orthogonal code symbols are fixedly allocated as designated by a reference number 912 to a pilot channel 910 used as a phase reference for the synchronous demodulation and a channel not enduring channel coding such as the common power control channel of FIG. 9, while the orthogonal code hopping multiplexing is performed with use of remained orthogonal code symbols.

It is also preferred to use the statistical multiplexing by the orthogonal code hopping multiplexing in a data area and not to use the orthogonal code hopping multiplexing in a pilot area not only when the pilot channel exists in the code division multiplexing method but also when performing the time division multiplexing for the pilot signal like W-CDMA (Wideband Code Division Multiple Access), another candidate technique of the IMT-200 system. In the send data area, the orthogonal code symbol used in the pilot area may be also used.

If the send antenna beams from the first communication station are different according to positions of the second communication stations such as smart antenna, the pilot signals are separately managed for each antenna beam. In addition, in an asynchronous modulation/demodulation system, which does not use the pilot signal and does not require the pilot signal, the orthogonal code hopping multiplexing is performed with use of all orthogonal code symbols in the orthogonal code.

Figure 4A:
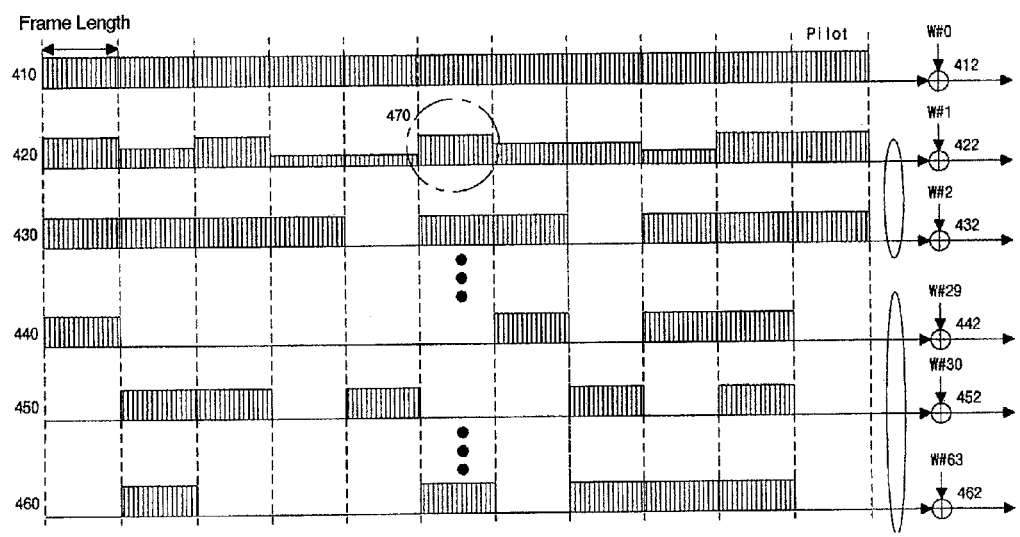
FIG. 4a shows a send signal of the first communication station according to the prior art.
Figure 4B:
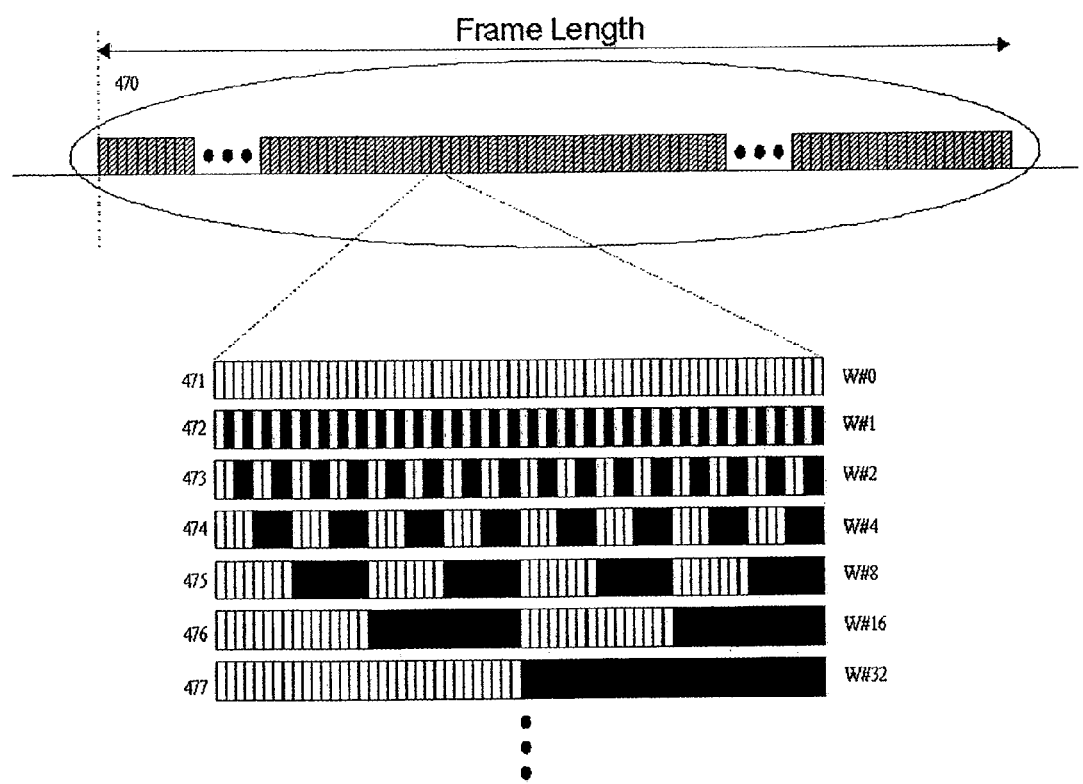
FIG. 4b shows an orthogonal code for distinguishing channels according to the prior art.
Figure 4C:
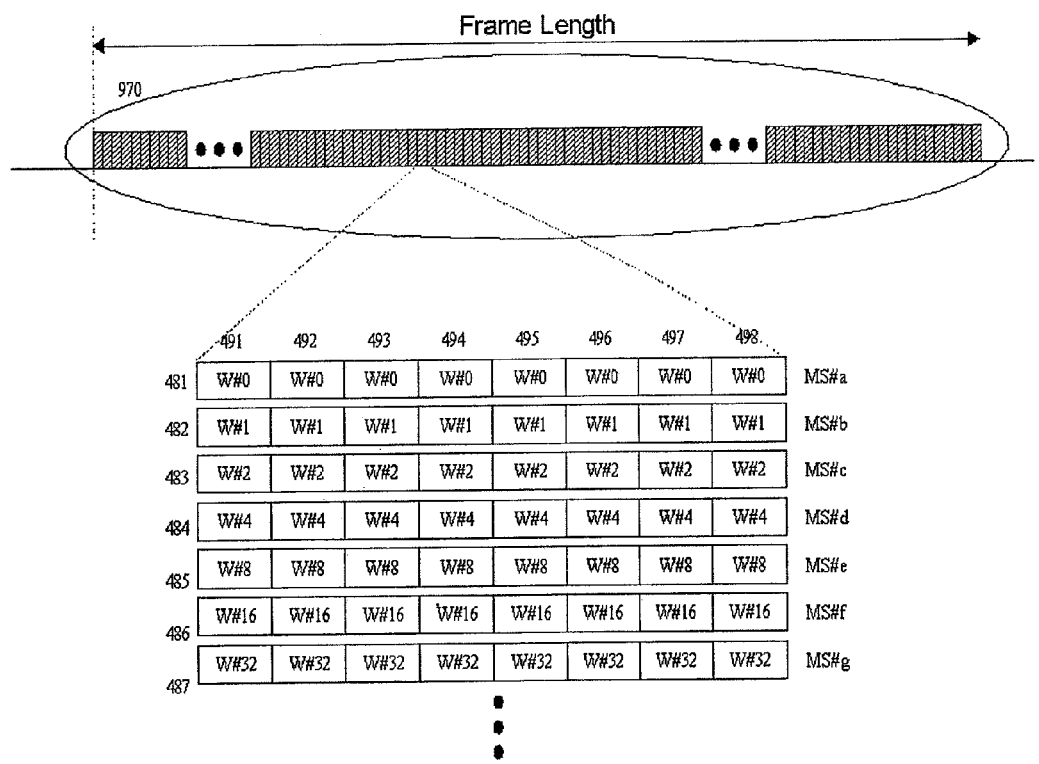
FIG. 4c shows the CDMA according to the prior art.
Figure 5:
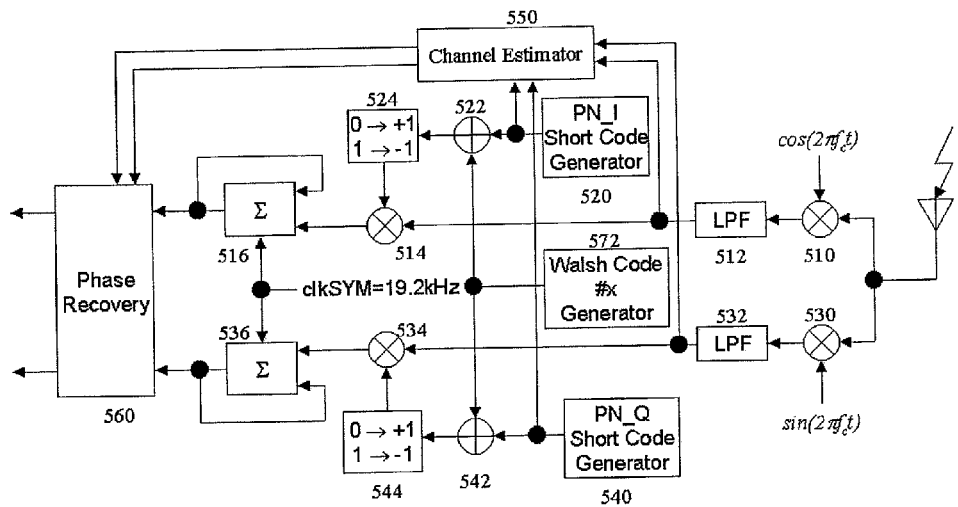
FIG. 5 shows a configuration of a receiver in the second communication station in the CDMA method according to the prior art.
Figure 6:
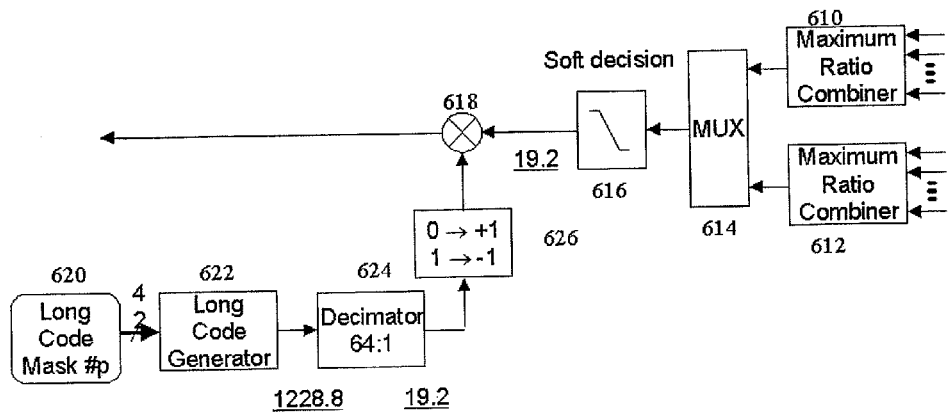
FIG. 6 shows a configuration of common components of the receiver in the second communication station according to the prior art and the present invention.
Figure 7:
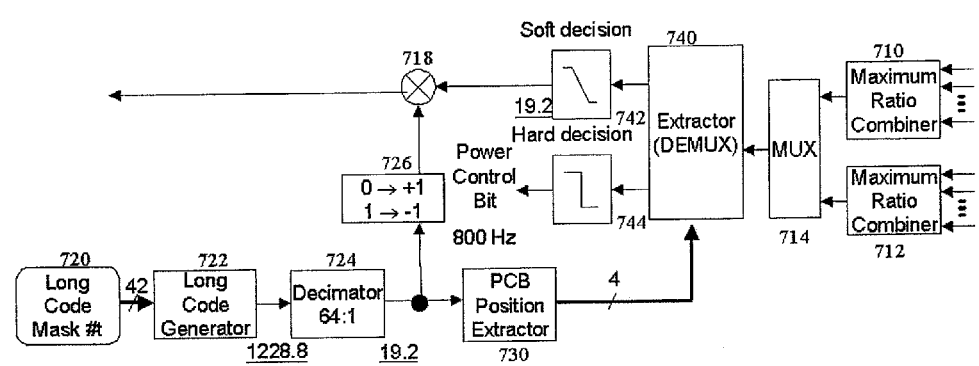
FIG. 7 shows a configuration of the receiver in the second communication station in FIG. 4b.
Figure 8:
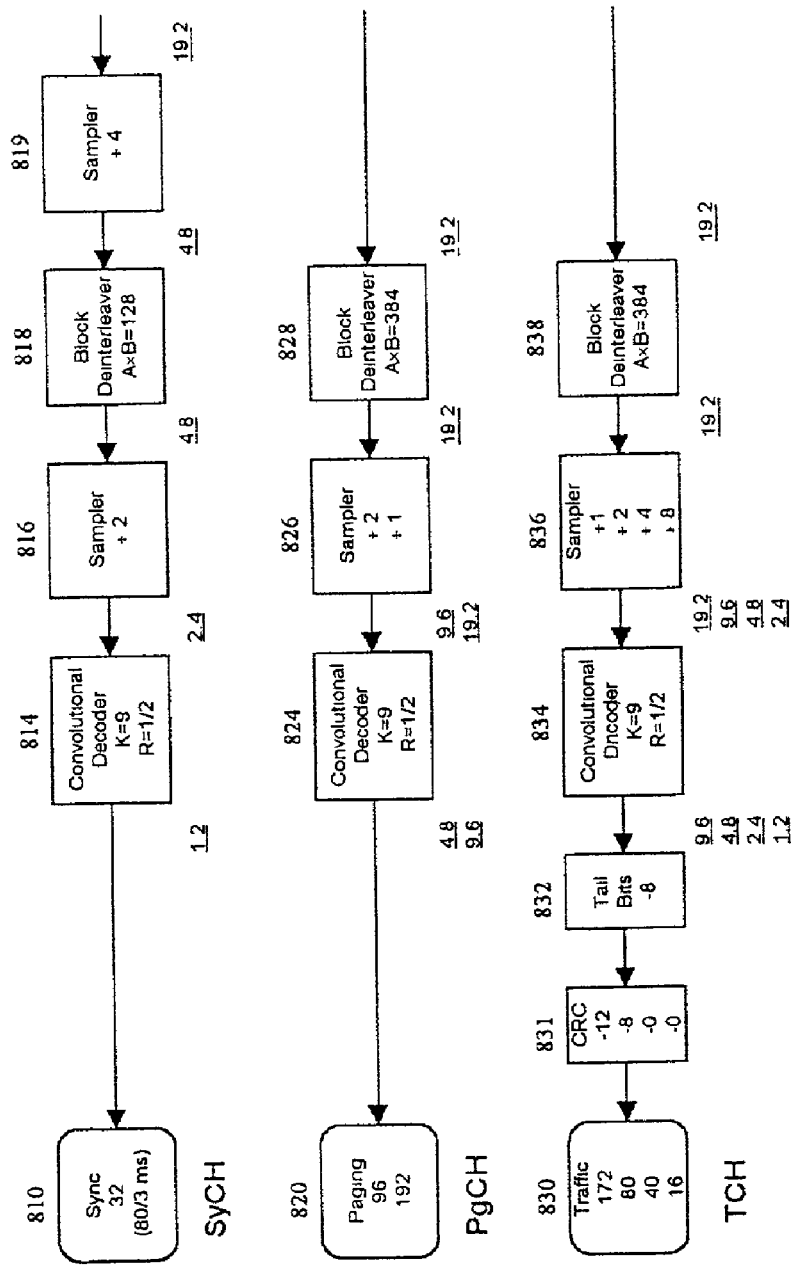
FIG. 8 shows a configuration of common components of the receiver according to the prior art and the present invention.

FIG. 14c shows an example of the orthogonal code symbol used for spreading the despreading data symbol according to the present invention. As shown in the figure, it will be easily known that a symbol of this embodiment has no difference from the prior art in FIG. 4b except the case that a different orthogonal code is used.

FIG. 14d shows a case of fixedly allocating the orthogonal code symbols to each channel having a high send data activity similar to the prior art.

FIG. 14e shows the orthogonal code hopping multiplexing according to the present invention, in which the hopping channels in each channel 1011, 1012, 1013, 1014, 1015, 1016, 1017 do not collide in all symbol areas 1021, 1022, 1023, 1024, 1025, 1026, 1027, 1028. However, in case of performing the orthogonal code hopping multiplexing as shown in FIG. 14h, it can be seen that the hopping patterns collide in the symbol areas 1041, 1043, 1046. In a time area 1041, the hopping patterns collide but the despreading data symbols coincide (shown with double-line box). Time areas 1043, 1046 is a case that the despreading data symbols do not coincide. Through the hopping patterns collide in the time areas 1043, 1046 as shown in FIG. 14g. however, in the case of time area 1061 where the send data symbols coincide, corresponding despreading data symbols are spread and transmitted, while in the case of time areas 1063, 1066 where the send data symbols do not coincide, transmission of all relevant channel is stopped.

Such channel stop is carried out for the channel group existing in the same send antenna beam from the first communication station. In case a plurality of send antenna beams 1120, 1130, 1140 from the first communication station, such as a smart antenna exist, the transmission is not stopped for channels 1132, 1142, 1144 in non-overlapped send antenna beams 1130, 1140 though the hopping patterns collide.

FIG. 14h shows the process of increasing transmission power as much as a regulated amount during a regulated time in order to satisfy an average receiving signal energy in the second communication station required for communication quality after an area where the transmission is stopped due to collision of the hopping patterns and discordance of the despreading data symbols as described above in brief, similar to FIG. 14g.

As described in the embodiments of the present invention, if the orthogonal code hopping multiplexing is performed with random hopping patterns, the send data may be lost in an area where the hopping patterns collide. Therefore, in order to recover the lost data, it is essential that the transmitter performs the channel encoding and the receiver performs the channel decoding.

The statistical multiplexing of the present invention may be used in combination with other multiplexing methods, such as, for example, a time division multiplexing, a frequency division multiplexing, a space division multiplexing, etc.

In addition, as a development of the orthogonal code division multiplexing system using a multi-code method, a plurality of channels may be allocated to one second communication station with use of a plurality of hopping patterns, which may realize a rapid send data rate. At this time, in allocating the multiple hopping patterns, the hopping patterns of each channel are generated as described above.

As described above, the present invention employs the statistical multiplexing method, namely the orthogonal code hopping multiplexing, in case that synchronized channels maintaining orthogonality have low activities, which may enable to use limited resources efficiently and increase less complexity than the prior art. The receiver particularly needs no increase of hardware except the orthogonal code hopping pattern generator. In addition, because the receiver and the transmitter perform spreading and despreading according to the respective hopping patterns without any process for excessive channel allocation or return for a traffic having a low activity from the first communication station to the second communication, the present invention may decrease waste of resources due to, such as, unnecessary control signal transmission and reduce buffer capacity and data transmission delay caused by scheduling of the send data of the first communication.

Moreover, the present invention may distinguish a nearly unlimited number of channels (if the hopping pattern has a period in a frame unit, near $64^{19.2\ ksps \times 20\ ms} = 64^{384}$ channels on the basis of the IS-95 system) when selecting the hopping patterns at random in comparison to the method of allocating the spreading orthogonal code symbols fixedly. Furthermore, although a collision may occur between the spreading orthogonal code symbols due to the random selection of the hopping patterns, there is no need to stop transmission of the colliding despreading data symbol in the case where the second communication station exists in an area where send antenna beams, such as, a sectored antenna and a smart antenna are not overlapped. In addition, the data symbols, which are not transmitted due to the hopping pattern collision between channels in the same send antenna beam, may be recovered in the channel decoding process of the second communication station without informing the second communication station.

The concept of the present invention may be applied to each carrier code group and each quasi-orthogonal code group in systems using a multiple carrier transmission method, a quasi-orthogonal code, etc. to realize the statistical multiplexing.

What is claimed is:

1. A method for orthogonal code hopping multiplexing communications in spread spectrum communication systems, the method comprising:

performing statistical multiplexing for communication channels from a primary communication station to secondary communication stations by using orthogonal code hopping multiplexing and controlling the transmission of spread data symbols from the primary communication station based on the result of collision comparison performed within the primary communication station.

2. The method of claim 1,
wherein the communication channels from the primary communication station to a the secondary communication stations are synchronized to distinguish the communication channels by using orthogonality.

3. The method of claim 1, further comprising:
distinguishing the communication channels from the primary communication station to the secondary communication stations with use of orthogonal code hopping patterns.

4. The method of claim 1,
wherein the orthogonal code comprises a Hadamard code.

5. The method of claim 1,
wherein the orthogonal code comprises a variable spreading factor code.

6. The method of claim 1,
wherein the orthogonal code comprises a Gold code.

7. The method of claim 3, further comprising:
allocating the orthogonal code hopping pattern to the secondary communication stations.

8. The method of claim 3,
wherein the orthogonal code hopping patterns are allocated to the secondary communication stations from the primary communication station when starting communication, and the secondary communication stations return the orthogonal code hopping patterns when the communication is completed.

9. The method of claim 3, further comprising:
performing the orthogonal code hopping multiplexing for a channel from among the communication channels having a low transmission data activity.

10. The method of claim 3, further comprising:
transmitting a command for controlling transmission power of each of the secondary communication stations using a separate common power control channel of the primary communication station.

11. The method of claim 10,
wherein the transmission power control command of each secondary communication station in the common power control channel is time-multiplexed and employs a collision-free hopping pattern for preventing collision of the hopping pattern.

12. The method of claim 11,
wherein the collision-free hopping pattern comprises a fixed orthogonal codeword allocation.

13. The method of claim 3,
wherein the orthogonal code hopping patterns for the statistical multiplexing are generated independently.

14. The method of claim 13,
wherein the independent code hopping patterns are generated using a pseudo-noise sequence generator.

15. The method of claim 3,
wherein a plurality of the orthogonal code hopping patterns for the statistical multiplexing are allocable to one of the secondary communication stations according to a transmission data rate of the primary communication station.

16. The method of claim 15,
wherein each of the orthogonal code hopping patterns hops independently in the orthogonal code hopping multiplexing communications.

17. The method of claim 15,
wherein the orthogonal code hopping patterns hop to avoid collisions in the orthogonal code hopping multiplexing communications.

18. The method of claim 3,
wherein the orthogonal code hopping patterns are periodically repeated in a frame unit.

19. The method of claim 18,
wherein the frame unit comprises an independent data unit based on channel encoding.

20. The method of claim 13,
wherein the primary communication station detects a hopping pattern collision caused by the random orthogonal code hopping patterns in advance to avoid transmitting a corresponding dispreading data symbol.

21. The method of claim 13, further comprising:
comparing data symbols at a time of a hopping pattern collision caused by the random orthogonal code hopping patterns in order to transmit the data symbols when all of the data symbols are the same.

22. The method of claim 13, further comprising:
comparing data symbols at a time of a hopping pattern collision caused by the random orthogonal code hopping patterns in order to not transmit the data symbols when the data symbols are not the same.

23. The method of claim 22, further comprising:
increasing a transmission power of a data symbol next to the data symbols, which are not transmitted because of discordance of the despreading data symbols at a time of the hopping pattern collision.

24. The method of claim 23,
wherein the transmission power is increased in accordance with a first system parameter during a period provided in accordance with a second system parameter.

25. The method of claim 24,
wherein the first system parameter and the second system parameter comprise position functions of the not-transmitted data symbols.

26. The method of claim 25,
wherein the first system parameter and the second system parameter are at least 0.

27. The method of claim 20,
wherein the hopping pattern collision is detected when there is a possibility that transmitting antenna beams of the first communication station are superposed so to cause an error in a channel decoding process of at least one of the second communication stations.

28. The method of claim 27,
wherein a pilot signal is used for initial acquisition and tracking of the channels and coherent detection of the channels owing to phase distortion compensation.

29. The method of claim 28,
wherein the pilot signal employs a collision-free hopping pattern for preventing a loss of compensation capability for phase distortion due to collision.

30. The method of claim 29,
wherein the collision-free hopping pattern comprises a fixed orthogonal codeword allocation.

31. An apparatus for orthogonal code hopping multiplexing communications in spread spectrum communication systems including a primary communication station and secondary communication stations, having communication channels from the primary communication station to the secondary communication station, the primary communication station including a transmitter, the apparatus comprising:

a channel encoder;
an orthogonal code hopping pattern generator for generating an orthogonal code hopping pattern;
an orthogonal code generator for generating an orthogonal codeword according to the orthogonal hopping pattern; and
an collision detector for detecting collisions of the hopping pattern;
a collision detector for detecting collisions of the hopping patterns;
wherein the transmitter comprises
a divider and allocator for dividing the orthogonal codewords into a first orthogonal codeword group for orthogonal code division multiplexing using fixed allocation and a second orthogonal codeword group for statistical multiplexing based on orthogonal code hopping multiplexing using orthogonal code hopping patterns.

32. The apparatus of claim 31, further comprising:
a transmission controller for transmitting or perforating the data symbols according to an output of the orthogonal code collision detector.

33. The apparatus of claim 32,
wherein the collision detector comprises a data symbol comparator for determining whether spread data symbols of corresponding channels are the same at the time of a hopping pattern collision; and
wherein the transmission controller does not transmit the data symbols when the spread data symbol comparator determines that the corresponding data symbols are not the same.

34. The apparatus as claimed in claim 31, wherein one of the secondary communication stations includes a receiver, the receiver comprising:
a channel decoder;
an orthogonal code hopping pattern generator for generating an orthogonal code hopping pattern; and
an orthogonal code generator for generating an orthogonal codeword according to the orthogonal hopping pattern;
wherein the channel is distinguished with use of the orthogonal code hopping patterns generated at random.

35. A method for orthogonal code hopping multiplexing communications in a spread spectrum communication system including a primary communication station and secondary communication stations having communication channels from the primary communication station to the second communication stations, the method comprising:
generating orthogonal code hopping patterns;
generating orthogonal codewords according to the orthogonal code hopping patterns;
dividing the orthogonal codewords into a first orthogonal codeword group for orthogonal code division multiplexing, the orthogonal codewords in the first orthogonal codeword group being fixedly allocated to a channel having a high data activity in communications for performing the orthogonal code division multiplexing, and into a second orthogonal codeword group for statistical multiplexing based on orthogonal code hopping multiplexing, the orthogonal codewords in the second orthogonal codeword group being used to perform orthogonal code hopping multiplexing for a channel having a low data activity according to the orthogonal code hopping pattern generated at random,
wherein a hopping pattern collision caused by the independent orthogonal code hopping patterns is detected in advance in order not to transmit a corresponding data symbol.

36. The method of claim 35, further comprising:
performing the orthogonal code division multiplexing by fixedly allocating the orthogonal codewords in the first orthogonal codeword group to a channels having high data activity.

37. The method of claim 35, further comprising:
performing an orthogonal code hopping multiplexing for a channel having a low data activity according to an orthogonal code hopping pattern by using only orthogonal codewords in the second orthogonal codeword group.

38. The method of claim 35,
wherein at least one orthogonal code comprises an orthogonal variable spreading factor code.

39. The method of claim 35,
wherein the first orthogonal codeword group consists of child codes generated from one parent code in a hierarchical orthogonal code generating tree structure according to variable spreading factors; and
wherein the second orthogonal codeword group consists of remaining orthogonal code symbols.

40. The method of claim 35,
wherein the first orthogonal codeword group comprises a variable spreading factor according to a transmission data rate.

41. The method of claim 35,
wherein the channel for the orthogonal code hopping multiplexing comprises a fixed data rate.

42. The method of claim 39,
further comprising selecting orthogonal codewords having the same spreading factor in the second orthogonal codeword group.

* * * * *